US008564806B2

(12) United States Patent
Kamasuka et al.

(10) Patent No.: US 8,564,806 B2
(45) Date of Patent: Oct. 22, 2013

(54) PRINTING APPARATUS AND PRINTING SYSTEM THAT PROVIDES FOR A PRINTING PRODUCT THAT INCLUDES A BASE FILE AND AN ATTACHED FILE

(75) Inventors: Atsushi Kamasuka, Matsudo (JP); Fumio Shoji, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 1304 days.

(21) Appl. No.: 11/668,857

(22) Filed: Jan. 30, 2007

(65) Prior Publication Data
US 2008/0049245 A1   Feb. 28, 2008

(30) Foreign Application Priority Data
Feb. 2, 2006   (JP) .................................. 2006-026176

(51) Int. Cl.
*G06F 3/12*   (2006.01)
(52) U.S. Cl.
USPC ........... 358/1.15; 358/1.1; 235/487; 235/491; 235/492
(58) Field of Classification Search
USPC ................... 358/1.15, 1.1; 235/487, 491, 492
See application file for complete search history.

(56) References Cited

U.S. PATENT DOCUMENTS

| 5,950,203 | A |   | 9/1999 | Stakuis et al. | |
|---|---|---|---|---|---|
| 6,078,921 | A | * | 6/2000 | Kelley ................................ | 1/1 |
| 6,480,895 | B1 |   | 11/2002 | Gray et al. | |
| 6,634,559 | B2 | * | 10/2003 | Shioda et al. ................. | 235/487 |
| 7,142,550 | B1 |   | 11/2006 | Umansky | |
| 7,515,144 | B2 | * | 4/2009 | Lapstun et al. ................ | 345/175 |
| 8,049,905 | B2 | * | 11/2011 | Matsumoto .................. | 358/1.13 |
| 2003/0079005 | A1 |   | 4/2003 | Myers et al. | |
| 2003/0161475 | A1 | * | 8/2003 | Crumly et al. ................ | 380/280 |
| 2003/0191941 | A1 |   | 10/2003 | Terada et al. | |
| 2005/0105148 | A1 |   | 5/2005 | Misawa | |
| 2005/0172224 | A1 | * | 8/2005 | Kobashi et al. ................ | 715/517 |
| 2007/0116198 | A1 | * | 5/2007 | Fujita-Yuhas ................ | 379/67.1 |
| 2008/0212827 | A1 |   | 9/2008 | Morita | |

FOREIGN PATENT DOCUMENTS

| JP | 07-121673 A | 5/1995 |
|---|---|---|
| JP | 11-164128 A | 6/1999 |
| JP | 2001-344588 | 12/2001 |
| JP | 2003-084950 A | 3/2003 |

OTHER PUBLICATIONS

Jul. 21, 2011 US Office Action that issued in related U.S. Appl. No. 11/668,807.
Feb. 4, 2011 U.S. Office Action, that issued in related U.S. Appl. No. 11/668,807.
Aug. 18, 2010 US Office Action that issued in related U.S. Appl. No. 11/668,807.
Oct. 29, 2010 Japanese Office Action, that issued in Japanese Patent Application No. 2006-026176.

* cited by examiner

*Primary Examiner* — Paul F Payer
(74) *Attorney, Agent, or Firm* — Cowan, Liebowitz & Latman, P.C.

(57) ABSTRACT

The printing apparatus includes a receiving unit which receives a print instruction about code information generated based on a file to be printed. The printing apparatus includes a transferring unit which transfers the file to be printed to a predetermined storage device when a size of the code information exceeds a threshold. The printing apparatus includes a printing unit which prints path information indicating a storage location of the transferred file to be printed as a list.

5 Claims, 25 Drawing Sheets

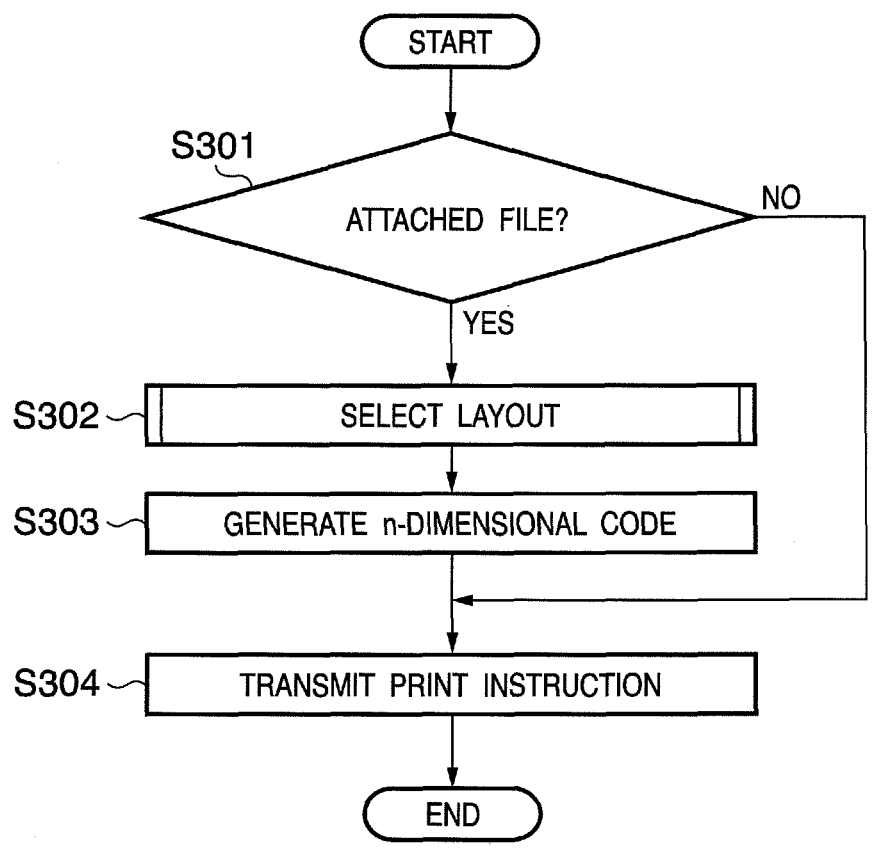

FIG. 11

| PURPOSE OF PRINTING | | CODE METHOD | FILE INFORMATION PRINT | RESOLUTION | LAYOUT |
|---|---|---|---|---|---|
| | SIZE | | | | |
| GENERAL | LARGE | CODE A | ○ | 300 | DIFFERENT PAGES |
| | SMALL | CODE B | ○ | 200 | SINGLE PAGE |
| DOCUMENT FILE | LARGE | CODE A | ○ | 300 | DIFFERENT PAGES |
| | SMALL | CODE B | ○ | 200 | SINGLE PAGE |
| IMAGE FILE | LARGE | CODE A | ○ | 300 | DIFFERENT PAGES |
| | SMALL | CODE A | ○ | 200 | SINGLE PAGE |
| AUDIO FILE | LARGE | CODE A | ○ | 300 | DIFFERENT PAGES |
| | SMALL | CODE B | ○ | 200 | SINGLE PAGE |
| MOVIE FILE | LARGE | CODE A | ○ | 300 | DIFFERENT PAGES |
| | SMALL | CODE A | ○ | 300 | DIFFERENT PAGES |
| TEXT FILE | LARGE | CODE B | ○ | 200 | SINGLE PAGE |
| | SMALL | CODE B | ○ | 100 | SINGLE PAGE |

LARGE ←—— EMBEDDABLE DATA PER CODE ——→ SMALL

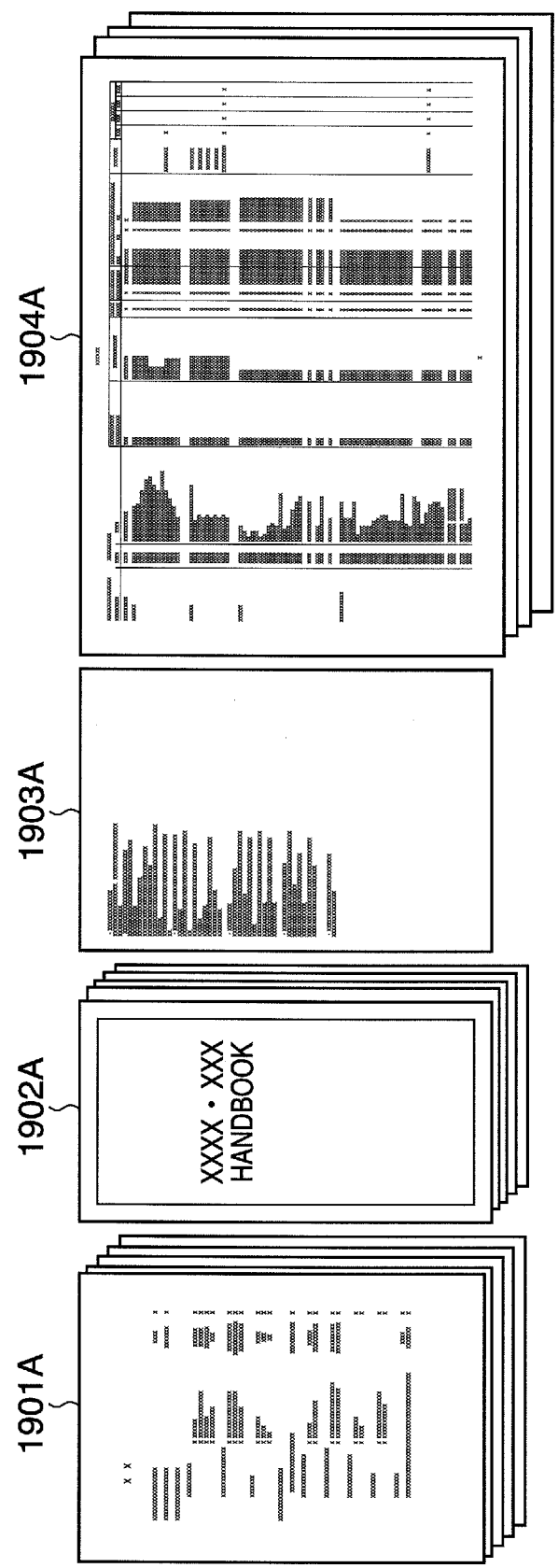

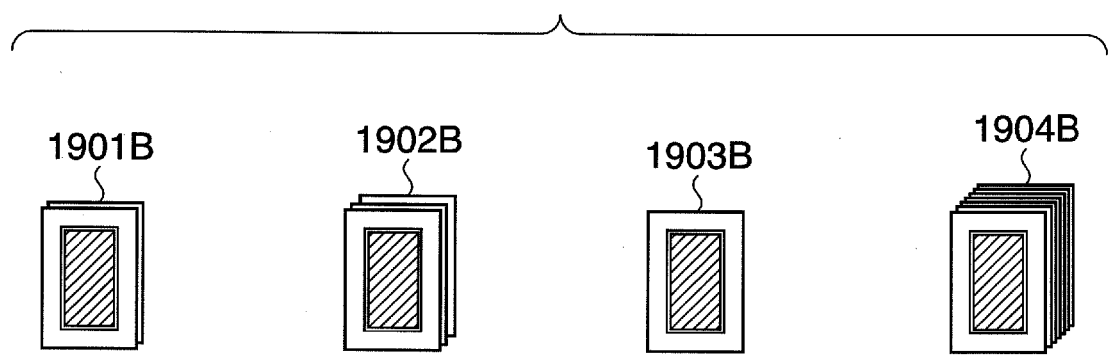
F I G. 19B

FIG. 19D

- ABCDEFGHIJKLMNOP
QRSTUVWXYZABCDE. FGHIJKLMNOPQRSTU
VWXYZABCD.
  EFGHIJKLMNOPQRSTUVWXYZABCDEF
GHIJKLMNOPQRSTUVWXYZABCDEFGHIJKLM
NOPQRSTU
VWXYZABCDEFGHIJKLMNOPQRSTUVW.
XYZABCDEFGHIJKLMNOPQRSTUVWXYZABC
DEFGHIJKL
MNOPQRSTUVWXYZABCDEFGHIJKLMNOPQR
STU.
VWXYZABCDEFGHIJKLMNOPQRSTUVWXYZA
B.
- CDEFGHIJKLMNOPQRSTUVWXYZABCDEFG
HIJKLMNO
PQRSTUVWXYZABCDEFGHIJKLMNOPQRSTU
VW.
XYZABCDEFGHIJKLMNOPQRSTUVWXYZABCD
EFGHIJ
KLMNOPQ.
RSTUVWXYZABCDEFGHIJKLMNOPQRSTUVW
XYZABCDEFGHIJ.
KLMNOPQR.

- STUVWXYZ
ABCDEFGHIJKLMNOPQRSTUVW.
XYZBCDEFGHIJKLMNOPQRSTUVWXYZABCDE
FGHIJKLMNOP
QRSTUVWXYZABCDEFGHIJKLMNOPQRSTUV
XYZ.
ABCDEFGHIJKLMNOPQRSTUVWXYZABCDEFG
HIJKLMNOP.
QRSTUVWXYZABCDEFGHIJKLMNOPQRSTUV
XYZABCDEFG.

- HIJKLMNOPQRSTUVWXYZAB
CDEFGHIJKLMNOPQRSTUVWXYZABCDEFGHI
JKLMNOPQRSTUV
WXYZABCDEFGHIJKLMNOPQRSTUVWXYZAB
DEFGHIJK.
LMNOPQRSTUVWXYZABCDEFGHIJKLMNOPQ
EFGHIJKLMNOPQRSTU.

- VWXYZABCDEFGHIJKLMNOPQRST
UVWXYZABCDEFGHIJKL

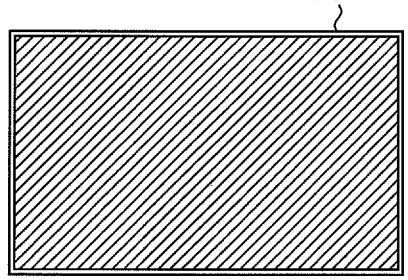
1901D

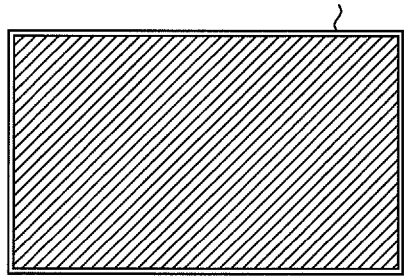
1902D

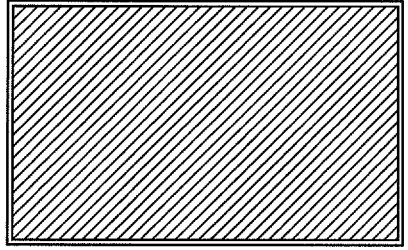
1903D

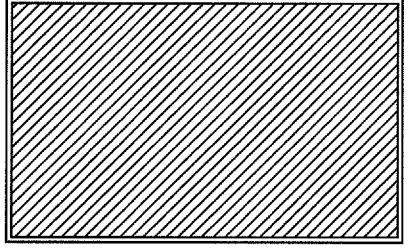
1904D

PRINTING APPARATUS AND PRINTING SYSTEM THAT PROVIDES FOR A PRINTING PRODUCT THAT INCLUDES A BASE FILE AND AN ATTACHED FILE

BACKGROUND OF THE INVENTION

1. Field of the Invention

The present invention relates to a technique for designating a file to be converted into code information and a technique for designating a print layout upon generating, e.g., a sheet on which code information is printed.

2. Description of the Related Art

Conventionally, n-dimensional codes represented by barcodes and QR codes are known (n is a natural number). Product information and the like can be embedded in each n-dimensional code. By reading an n-dimensional code printed on a sheet, the user can easily acquire product information or the like.

On the other hand, in recent years, an n-dimensional code which can express data with a size larger than the above code is available. Japanese Patent Application Laid-Open No. 2001-344588 discloses a technique for printing thumbnails of some pages included in a designated document file and a two-dimensional code of the entire document on a single sheet.

However, the technique described in Japanese Patent Application Laid-Open No. 2001-344588 can designate a document file as a print target but cannot designate another file having different contents as an attached file. That is, the technique described in Japanese Patent Application Laid-Open No. 2001-344588 can only print thumbnails and attribute information (a file name and the like) acquired from a base file such as a document file or the like on a single sheet. The attribute information is often generally called file information.

Especially, even when the user wants to print an n-dimensional code of an attached file together with a base file as a main print target on a sheet, a conventional printer driver or printing apparatus does not comprise any means that allows the user to easily select the attached file. For example, upon printing a document file of a cover letter or the like, and an attached file such as an image or the like on a sheet, the user cannot select any attached file in the printer driver or the like.

As a method that meets such demands, a method of directly editing a document file on application software may be used. However, in this case, since the attached file such as an image or the like is directly embedded in the document file, a problem is posed when the user does not want to change the document file. Also, such edit functions must be added to each application software, thus posing another problem.

SUMMARY OF THE INVENTION

The present invention is implemented in a printing apparatus. The printing apparatus includes a receiving unit which receives a print instruction about code information generated based on a file to be printed. The printing apparatus includes a transferring unit which transfers the file to be printed to a predetermined storage device when a size of the code information exceeds a threshold. The printing apparatus includes a printing unit which prints path information indicating a storage location of the transferred file to be printed as a list.

Further features of the present invention will become apparent from the following description of exemplary embodiments with reference to the attached drawings.

BRIEF DESCRIPTION OF THE DRAWINGS

FIG. 3 is a flowchart showing an example of print instructing processing according to the embodiment;

FIG. 11 shows an example of a table used to select a layout according to the embodiment;

FIG. 19A shows print results obtained upon execution of a common print mode according to the embodiment;

FIG. 19B shows print results obtained upon execution of a code print mode according to the embodiment;

FIG. 19D shows print results obtained upon execution of an attachment print mode according to the embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1A:
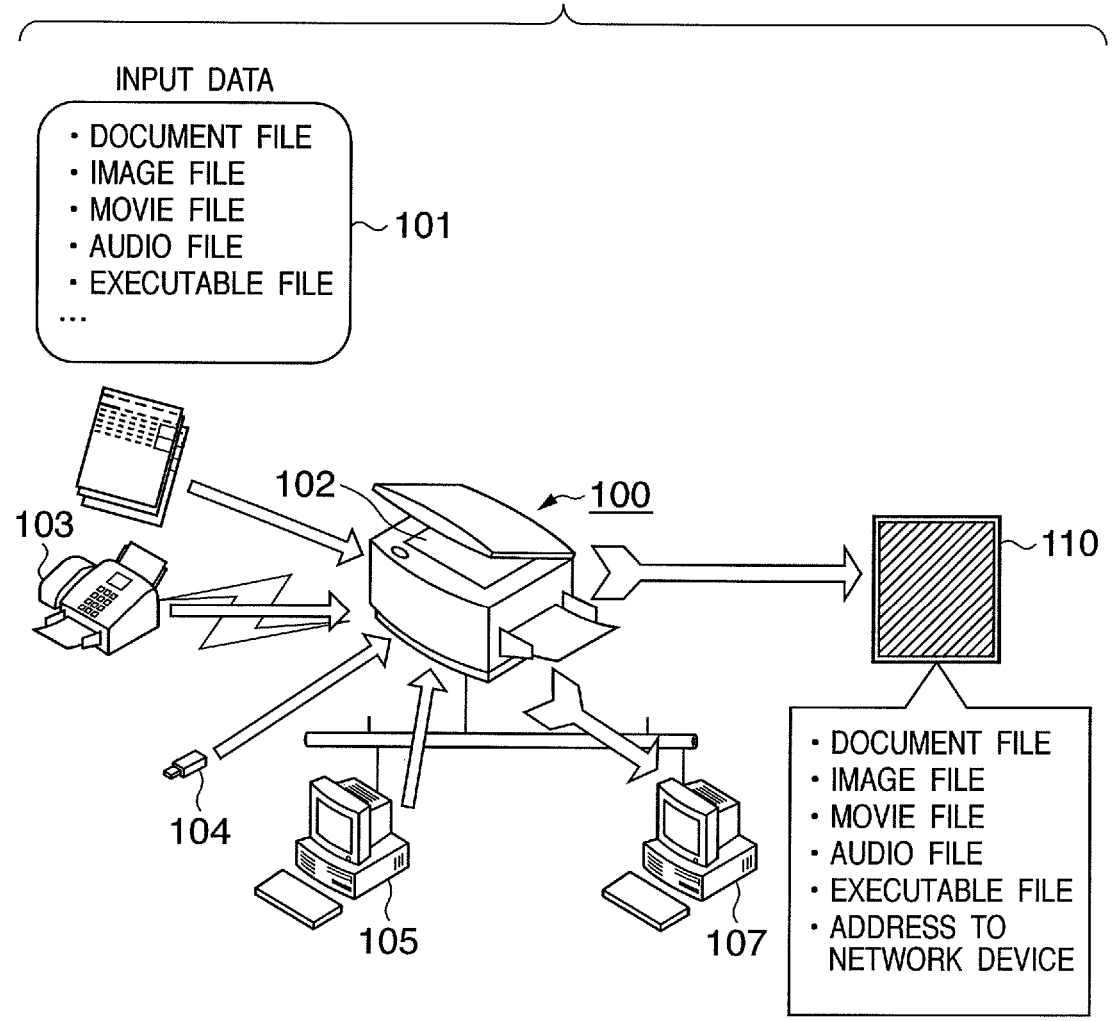
FIG. 1A is a diagram showing the generation concept of a data sheet according to one embodiment of the present invention.
Figure 1B:
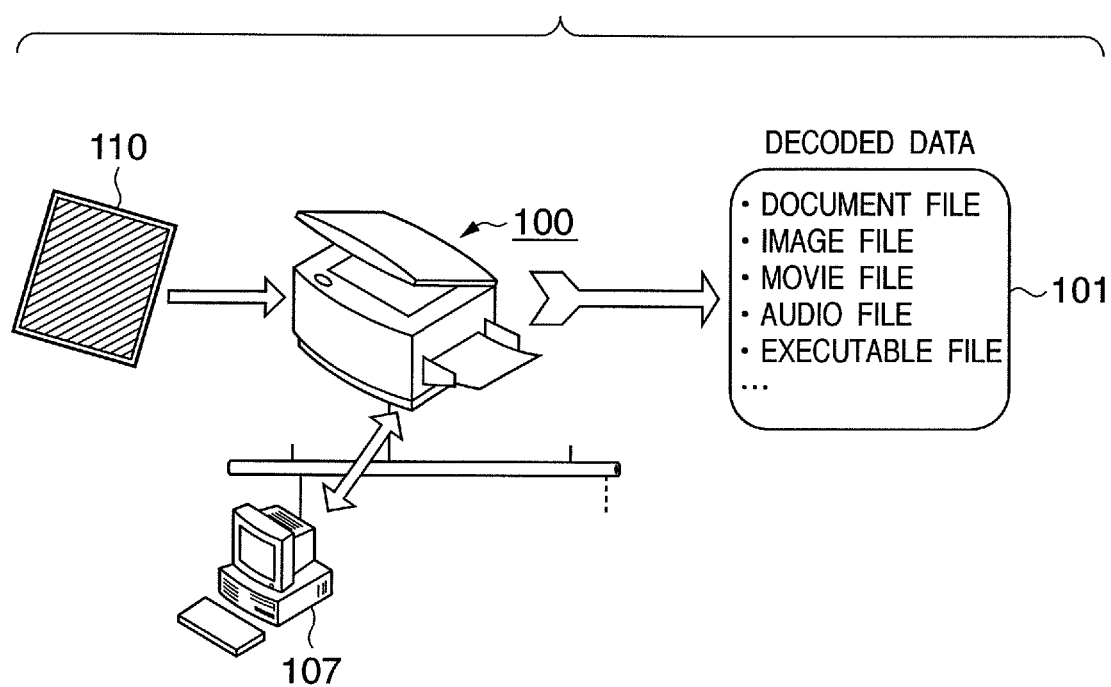
FIG. 1B is a diagram showing a use example of the data sheet according to the embodiment.

FIG. 1A shows the generation concept of a data sheet according to one embodiment. FIG. 1B shows an example of the use of the data sheet according to the embodiment. A multi-function peripheral (MFP) 100 is an example of a printing apparatus or printing system according to the present invention. The printing system of the present invention includes a print instructing apparatus and printing apparatus. Also, network devices (e.g., PCs and the like) 105 and 107 are examples of print instructing apparatuses. Furthermore, a control device, printer driver, and the like, which operate on the MFP and the like are examples of the print instructing apparatuses. Code information is, for example, an n-dimensional code. As an example of the n-dimensional code, a two-dimensional (2D) code will be described below. Note that n is a natural number, and upon encoding a great volume of information, n is desirably a natural number equal to or larger than 2.

[Overview of Printing Processing]

In FIG. 1A, the MFP 100 is an apparatus which executes printing processing of a 2D code, and will also be referred to as an input/output apparatus, printer, printing apparatus, image forming apparatus, or encoding apparatus. Note that a PC (personal computer), scanner, printer, and the like are combined to form a printing apparatus used to execute printing processing of a 2D code in place of the MFP 100.

Input data 101 input as processing targets include, e.g., a document file, image file, movie file, audio file, executable file, and the like. These files are input from a scanner 102, a FAX apparatus 103 via a telephone line, an external storage medium 104, or the network device 105 to the MFP 100. Note that the external storage medium 104 includes, e.g., a magnetic disk, optical disk, magneto-optical disk, USB memory, memory card, and the like. Note that in the present invention, the input data 101 includes a base file as a main print target and an attached file as a sub print target.

The MFP 100 encodes file information (e.g., attribute information such as a file name and the like) of the input data 101, and the input data itself (e.g., the base file, attached file, and the like) to generate 2D codes. Next, the MFP 100 prints the generated 2D codes on a sheet (also called a print sheet or transfer material) 110. The sheet on which the 2D codes of the respective input data 101 are printed will be referred to as a data sheet hereinafter.

When the user designates an attached file having a predetermined size or more, the MFP 100 may store that attached file in the network device 107, and may print a 2D code which represents path information of the stored attached file on the data sheet together with the data sheet. In this case, the network device 107 serves as a storage device (e.g., a network file server or the like). The MFP 100 may store the attached file in its own storage device in place of the network device 107.

[Restoration Processing]

In FIG. 1B, the MFP 100 restores the attached file by reading the 2D code printed on the data sheet 110. If the 2D code is the path information of an attached file, the MFP 100 may download the attached file based on the path information and may display, print, or transmit the attached file.

[Apparatus Arrangement]

Figure 2A:
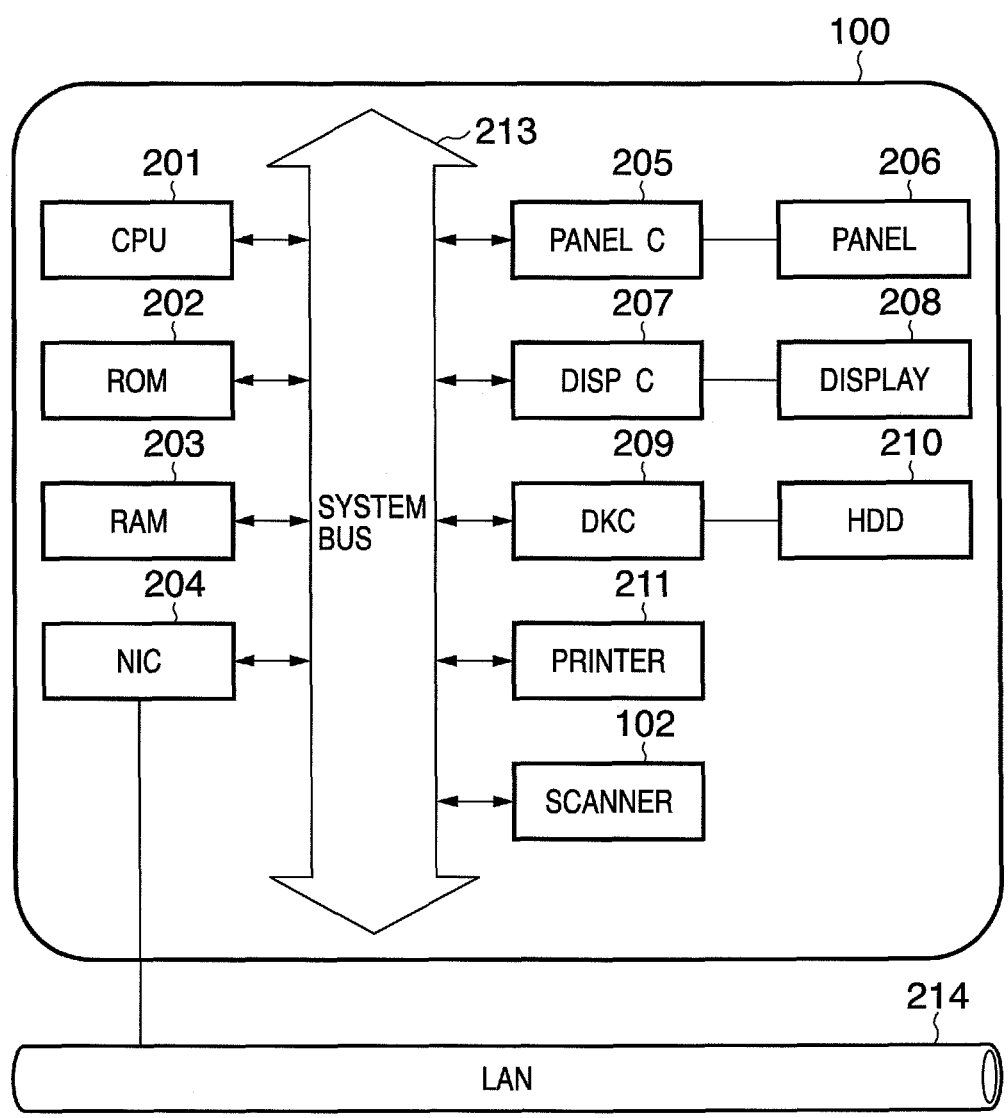
FIG. 2A is a block diagram showing an example of the internal arrangement of an multi-function peripheral (MFP) according to the embodiment.

FIG. 2A shows an example of the internal arrangement of the MFP according to the embodiment. The MFP 100 comprises a CPU 201 which executes software stored in a ROM 202 or a large-capacity storage device (to be referred to as an HDD hereinafter) 210 such as a hard disk or the like. The CPU 201 systematically controls respective devices connected to a system bus 213. A RAM 203 is a storage device which serves as a main memory, work area, and the like of the CPU 201.

A network interface card (NIC) 204 exchanges data with another network device, file server, and the like via a LAN 214. Note that the MFP 100 may comprise a communication unit with a facsimile communication function. Also, the MFP 100 may comprise a connection unit (e.g., a USB host unit, memory card reader, or the like) used to connect the aforementioned external storage medium 104.

An external input controller (PANELC) 205 controls a control panel (various buttons or a touch panel) 206 equipped on the MFP. A display controller (DISPC) 207 controls display on a display module (DISPLAY) 208. The display module 208 comprises, e.g., a liquid crystal display or the like. A storage control unit 209 controls data read and write accesses to the HDD 210. The HDD 210 may comprise a nonvolatile storage medium other than the hard disk drive.

A print unit 211 is implemented by, e.g., an electrophotography system, ink-jet system, or the like, and executes printing processing on a sheet. The scanner 102 is a unit that scans an image printed on the sheet, as described above. Normally, the scanner 102 mounts an auto document feeder (ADF), and can automatically scan a plurality of documents.

Figure 2B:
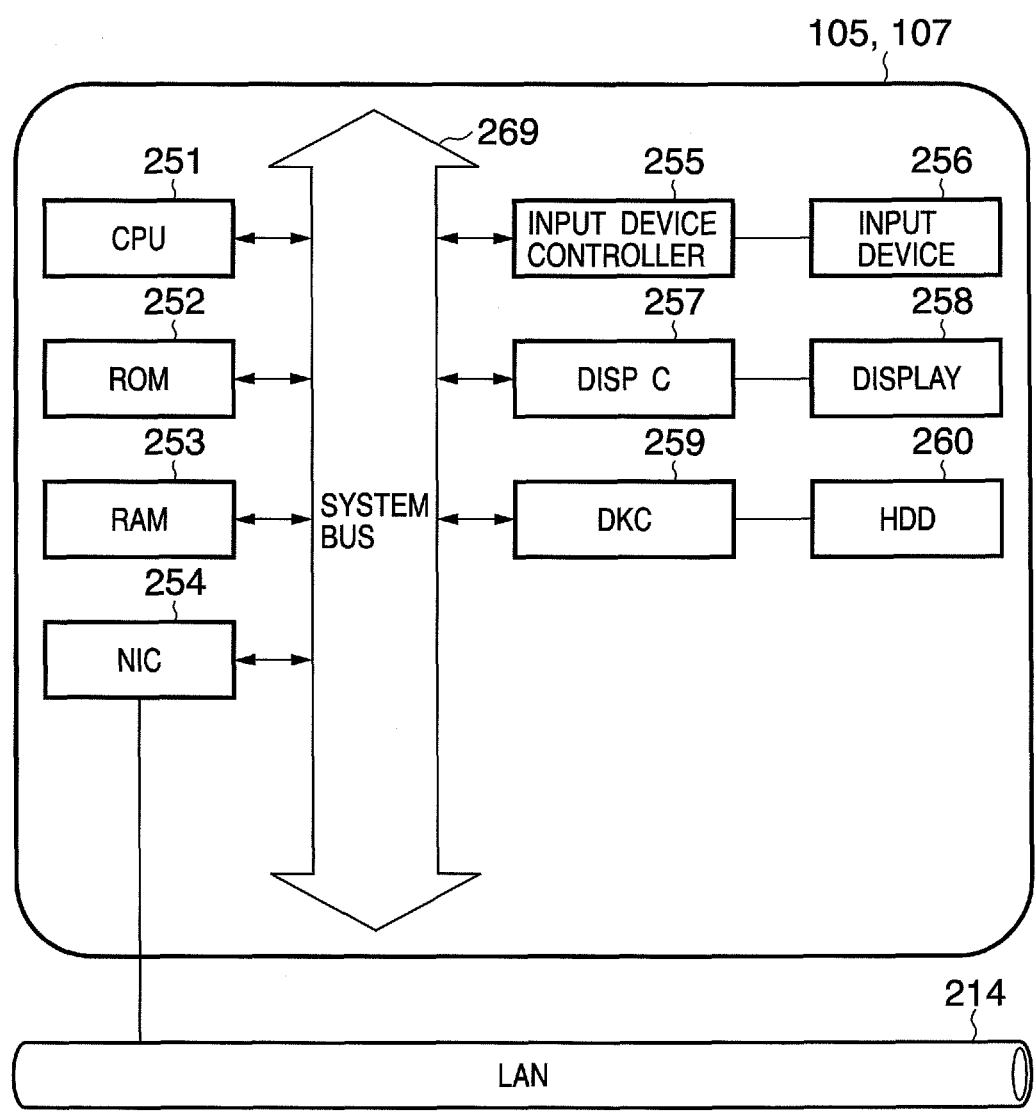
FIG. 2B is a block diagram showing an example of the internal arrangement of a network device according to the embodiment.

FIG. 2B shows an example of the internal arrangement of the network device according to the embodiment. Each of the network devices 105 and 107 comprises a CPU 251 which executes software stored in a ROM 252 or a large-capacity storage device 260 such as a hard disk or the like. The CPU 251 systematically controls respective devices connected to a system bus 269. A RAM 253 is a storage device which serves as a main memory, work area, and the like of the CPU 251.

A network interface card (NIC) 254 exchanges data with the MFP 100, another network device, and the like via the LAN 214.

An input device controller 255 controls an input device 256 connected to the network device. The input device 256 comprises, e.g., a keyboard, pointing device (e.g., a mouse), and the like. A display controller (DISPC) 257 controls display on a display module (DISPLAY) 258. The display module 258 comprises, e.g., a liquid crystal display or the like. A storage control unit 259 controls data read and write accesses to the large-capacity storage device 260. The large-capacity storage device 260 may comprise a nonvolatile storage medium other than the hard disk drive.

[Details of Print Instructing Processing]

FIG. 3 is a flowchart showing an example of the print instructing processing according to the embodiment. The following description will be given under the assumption that the network device 105 executes print instructing processing for the MFP 100. However, the CPU 201 of the MFP 100 may execute the print instructing processing for the print unit 211. In this case, assume that the base file and attached file to be printed are stored in the HDD 210.

Assume that a computer program required to implement the print instructing processing is pre-stored in the RON 252 or the large-capacity storage device 260. Note that the computer program may be implemented as either a printer driver or application software. Of course, if the computer program is implemented as the printer driver, the application software need not be altered.

When the user inputs a print instruction at an application that handles a document and image (base file) to be edited, browsed, or used, the CPU 251 launches the printer driver. After the printer driver is launched, the CPU 251 displays an operation dialog on the display module 258.

Figure 4:
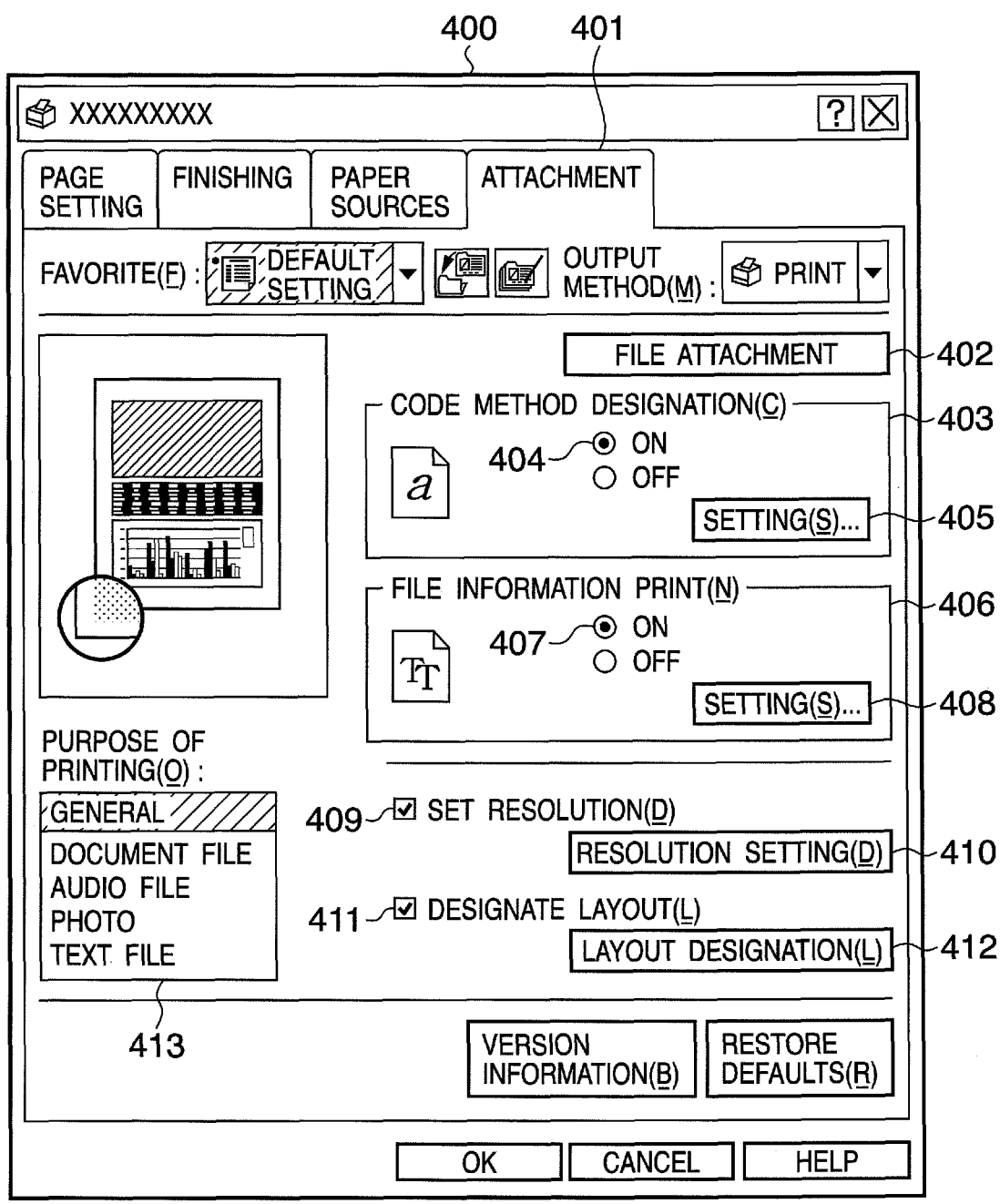
FIG. 4 shows an example of an operation dialog of a printer driver according to the embodiment.

FIG. 4 shows an example of an operation dialog of the printer driver according to the embodiment. Via an operation dialog 400, the user can execute designation of an attached file, that of a code method, that as to whether or not to print file information (attribute information), that of the purpose of printing, a setting of a printing resolution, designation of a layout, and the like.

The operation dialog 400 includes an attachment tag 401 used to make settings about an attached file. The attachment tag 401 includes a file attachment button 402 used to select an attached file.

Figure 5:
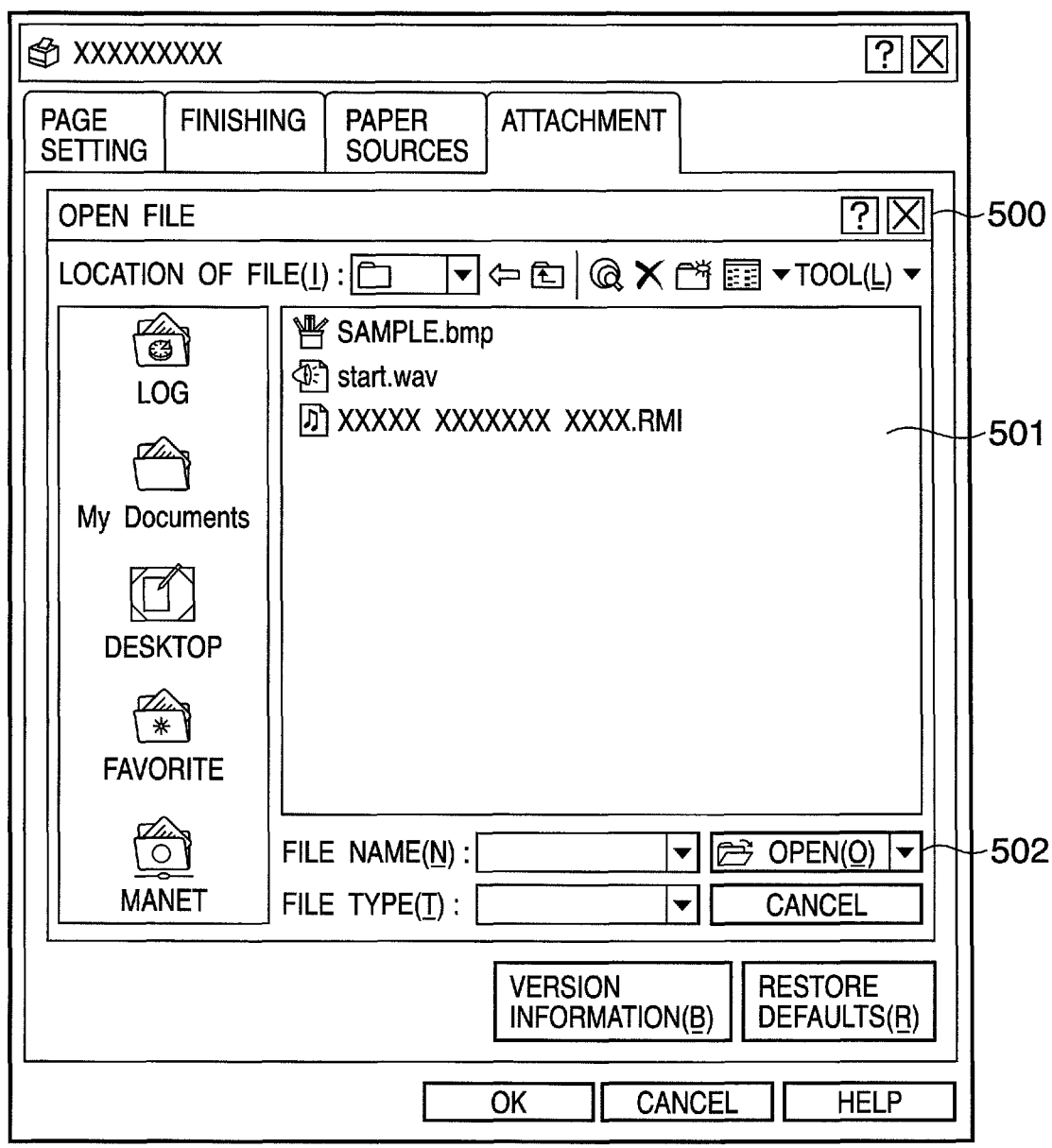
FIG. 5 shows an example of a file selection dialog according to the embodiment.

FIG. 5 shows an example of a file selection dialog according to the embodiment. Upon detection of pressing of the file attachment button 402, the CPU 251 displays a file selection dialog 500 on the display module 258. A file list 501 is that of selectable files. The user selects one or more files displayed on the file list 501 using the input device 256. When the user presses an open button 502 while one or more files are selected, the CPU 251 recognizes the selected files as attached files.

A code method designation area 403 comprises radio buttons 404 used to select whether or not to select a code method, and a setting button 405 used to set the code method. Note that when the user selects using the radio button 404 that he or she does not designate any code method, the CPU 251 may encode the attached file using a default code method.

Figure 6:
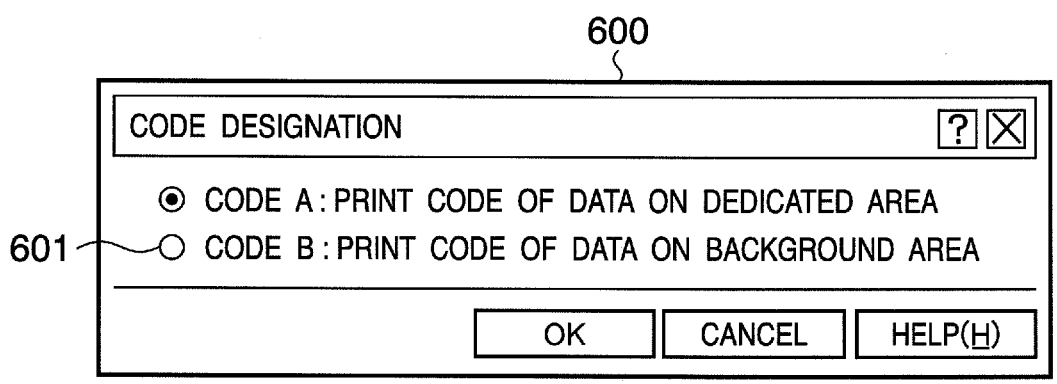
FIG. 6 shows an example of a dialog used to designate a code method according to the embodiment.

FIG. 6 shows an example of a dialog used to designate the code method according to the embodiment. Upon detection of pressing of the setting button 405, the CPU 251 displays a code method designation dialog 600 on the display module 258. The code method designation dialog 600 includes radio buttons 601 used to designate a code method. Note that three or more code methods may be exclusively designated. In FIG. 6, code A indicates a code method which has a relatively large embeddable information size, and prints a 2D code on a dedicated area on a sheet. Also, code B indicates a code method which has a relatively small embeddable information size, and prints a 2D code on the entire background of a sheet as a watermark (which is not easy to see by the human eye).

A file information print designation area 406 includes radio buttons 407 used to set whether or not to print file information, and a setting button 408 used to set file information to be printed. Upon pressing the setting button 408, the CPU 251 displays a setting dialog used to set a print target on the display module 258.

Figure 7:
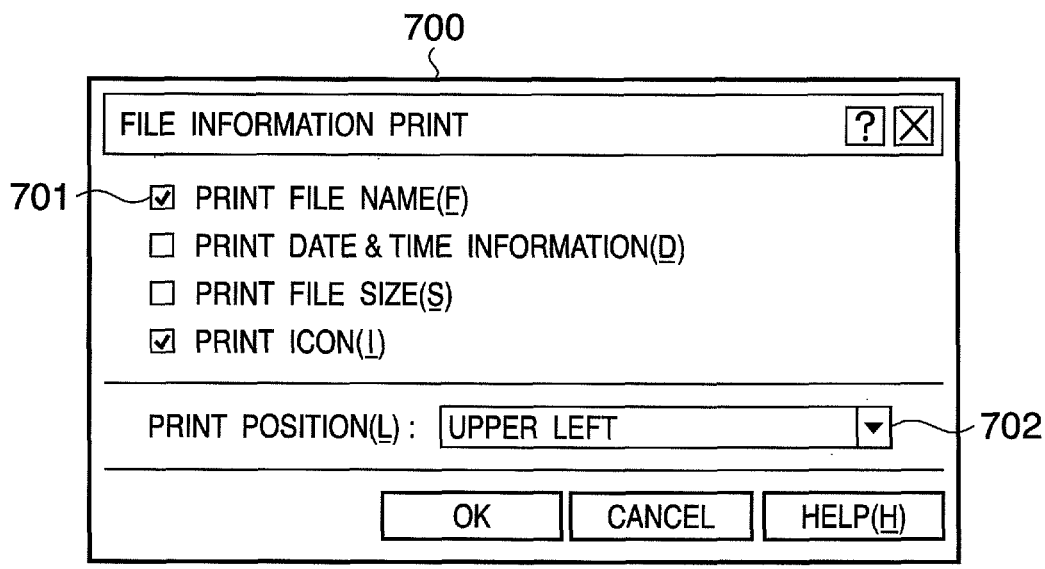
FIG. 7 shows an example of a dialog used to set file information according to the embodiment.

FIG. 7 shows an example of a dialog used to set file information according to the embodiment. A setting dialog 700 comprises check boxes 701 used to set file information to be printed, and a pull-down menu 702 used to set the print position of the file information on the data sheet. FIG. 7 shows a file name, information of the date & time of creation of a file, file size, icon, and the like as example of the file information. As the print position, the user can designate upper left, upper right, lower left, lower right, or the like on the sheet from the pull-down menu 702. Note that the icon is image information which represents the file type such as PDF, JPG, or the like.

A check box 409 is used to select whether or not to set a resolution upon printing the 2D code of the attached file. A resolution setting button 410 is pressed to open a dialog for setting a practical resolution.

Figure 8:
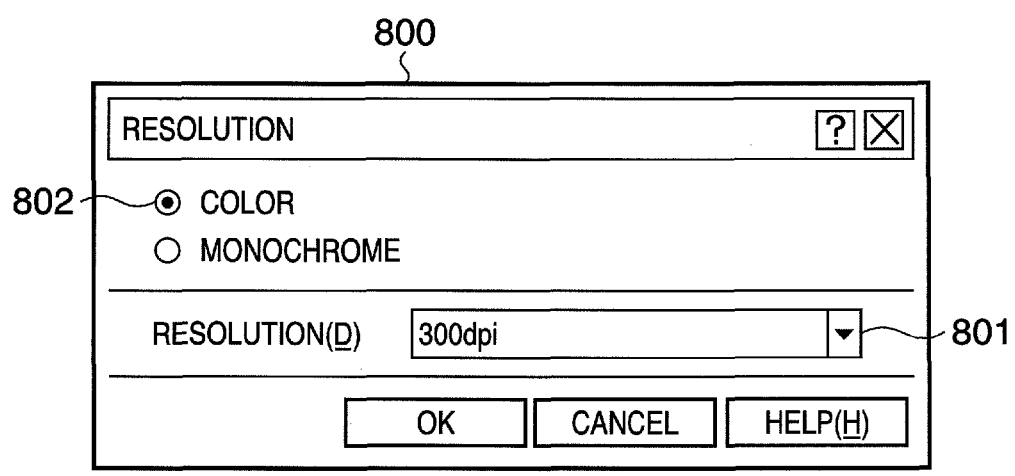
FIG. 8 shows an example of a dialog used to set a resolution according to the embodiment.

FIG. 8 shows an example of a dialog used to set a resolution according to the embodiment. A resolution setting dialog 800 includes a pull-down menu 801 used to designate a resolution, and radio buttons 802 used to designate color printing or monochrome printing.

A check box 411 is used to designate whether or not to designate a layout. A layout designation button 412 is pressed to open a dialog used to designate a practical layout.

Figure 9A:
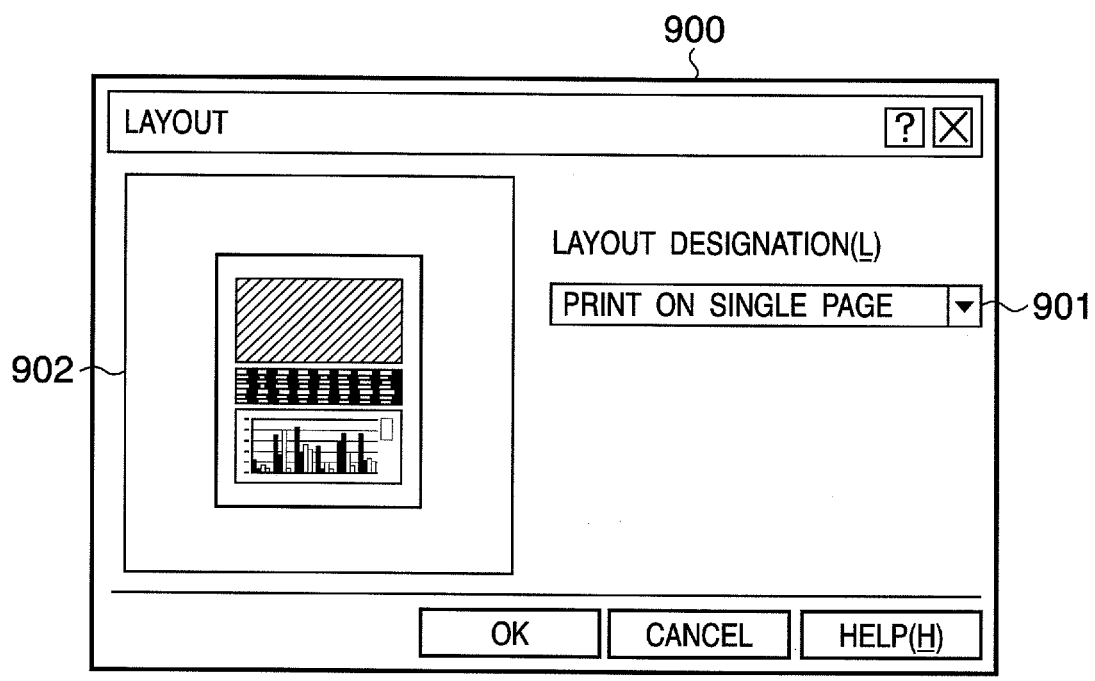
FIGS. 9A and 9B show examples of a dialog used to designate a layout according to the embodiment.
Figure 9B:
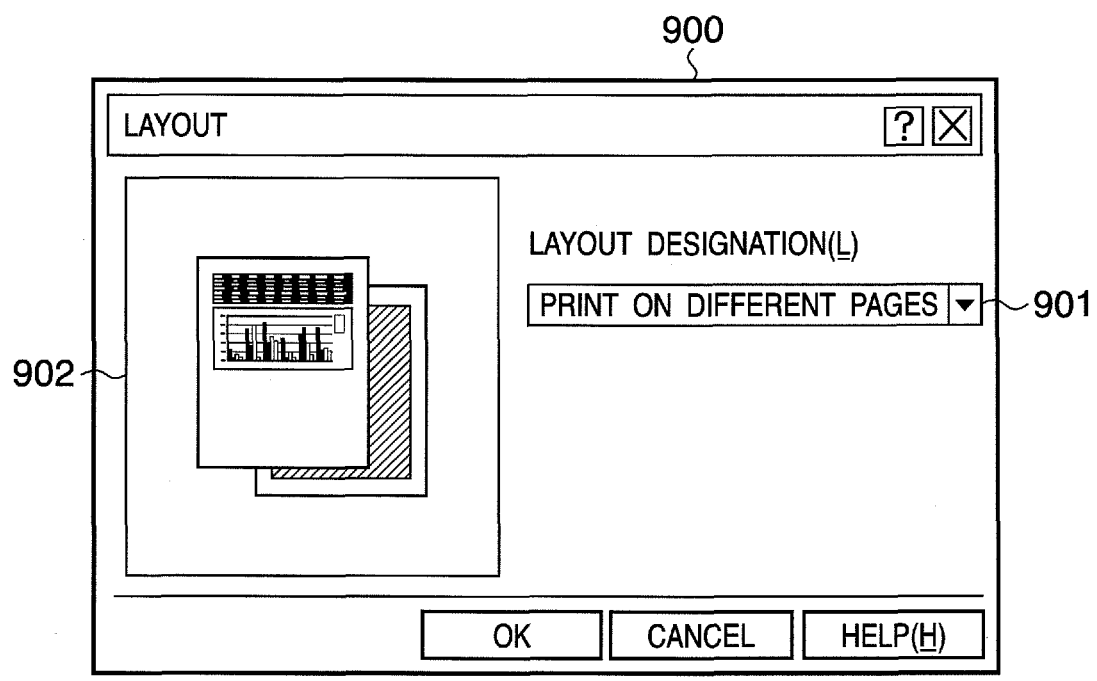

FIGS. 9A and 9B show examples of a dialog used to designate a layout according to the embodiment. A layout designation dialog 900 comprises a pull-down menu 901 used to designate a layout, and a window 902 that shows an example of the designated layout. The layout that the user can designate includes, e.g., a first print layout which prints the base file and attached file on a single page, and a second print layout which prints the base file and attached file on different pages. Of course, another print layout may be selected from the pull-down menu 901.

Assume that the user selects the first print layout that prints the base file and attached file on a single page. In this case, the base file is reduced in size to fall within a predetermined base file area, and code information of the attached file of a part that can fall within a predetermined attached file area is printed on the single page. Then, the code information of the attached file of a part which falls outside the predetermined attached file area may be printed on another page.

The print size of the base file is checked, the code information of the attached file of a part which can fall within the remaining area of the base file is printed on the single page, and that of the attached file of a part which falls outside the remaining area of the base file may be printed on another page.

Alternatively, the print size of the code information of the attached file is checked, and the base file may be printed in a reduced scale if it falls outside the remaining area of the code information of the attached file.

It is not indispensable to assure the window 902 that shows the example of the designated layout. FIG. 9A shows an example of the first print layout in the window 902. FIG. 9B shows an example of the second print layout in the window 902. In this way, the user can visually confirm the designated print layout.

A printing purpose selection area 413 is assured to select the purpose of printing of the attached file to be printed. FIG. 4 shows, as examples of the purpose of printing, general, document file, audio file, photo (image file), and text file. Of course, the printing purpose selection area 413 may be configured to allow the user to select other purposes of printing.

In this way, the operation dialog 400 serves as a designating unit which is used to designate at least one of the code method of the n-dimensional code, the printing resolution of the n-dimensional code, printing/non-printing of file information associated with the attached file, and the print position of the attached file on the sheet. Note that a computer program corresponding to the CPU 251, input device 256, or operation dialog 400 can be interpreted as a designating unit. Especially, the use of such designating unit facilitates operations required to obtain a desired print result.

The description will reverse to the flowchart of FIG. 3. The CPU 251 checks in step S301 if an attached file is to be printed together with a base file. For example, if the user presses the file attachment button 402 and selects an arbitrary file, the CPU 251 determines that the attached file is to be printed. In this case, the process advances to step S302.

In step S302, the CPU 251 selects a print layout used to print the base file and attached file. For example, the CPU 251 may select a print layout suited to the selected purpose of printing from a plurality of print layouts which are prepared in advance. In this case, the need for complicated operations required to set the print layout can be obviated. Note that a detailed example of the selection processing will be described later.

In step S303, the CPU 251 generates a 2D code by encoding the attached file.

In step S304, the CPU 251 transmits a print instruction of the base file and the 2D code of the attached file to the MFP 100. Note that the CPU 251 generates print data (e.g., PDL (page description language) data or the like) by applying the selected print layout to the base file and attached file. More specifically, assume that the printer of the MFP can interpret PDL data. In case an attached file is absent, the data to be transmitted in step S304 includes PDL data generated based on the base file. In case an attached file is present, the data to be transmitted in step S304 includes PDL data that prints the base file at a position according to the selected layout, and PDL data that prints the 2D code of the attached file at a position according to the selected layout.

Note that the CPU 251 may generate raster data as print data and may transmit it to the MFP 100. More specifically, assume that the printer of the MFP is a host base printer which prints raster data generated at the host side. In case an attached file is absent, the data to be transmitted in step S304 includes raster data rendered based on the base file. On the other hand, in case an attached file is present, the data to be transmitted in step S304 includes raster data obtained by rendering the base file according to the selected layout, and raster data obtained by rendering the 2D code of the attached file according to the selected layout.

By recognizing the processing capacity of the CPU 251 and the processing capacity and processing status of the MFP 100, whether or not the CPU 251 had better to execute the generation processing of raster data to obtain higher efficiency may be checked. If higher efficiency is obtained, the CPU 251 generates raster data. On the other hand, if the CPU 201 had better to execute the generation processing of raster data to obtain higher efficiency, it generates raster data.

On the other hand, if it is determined in step S301 that an attached file is not printed, the process jumps to step S304, and the CPU 251 transmits a print instruction required to print the base file as per normal to the MFP 100.

Figure 10:
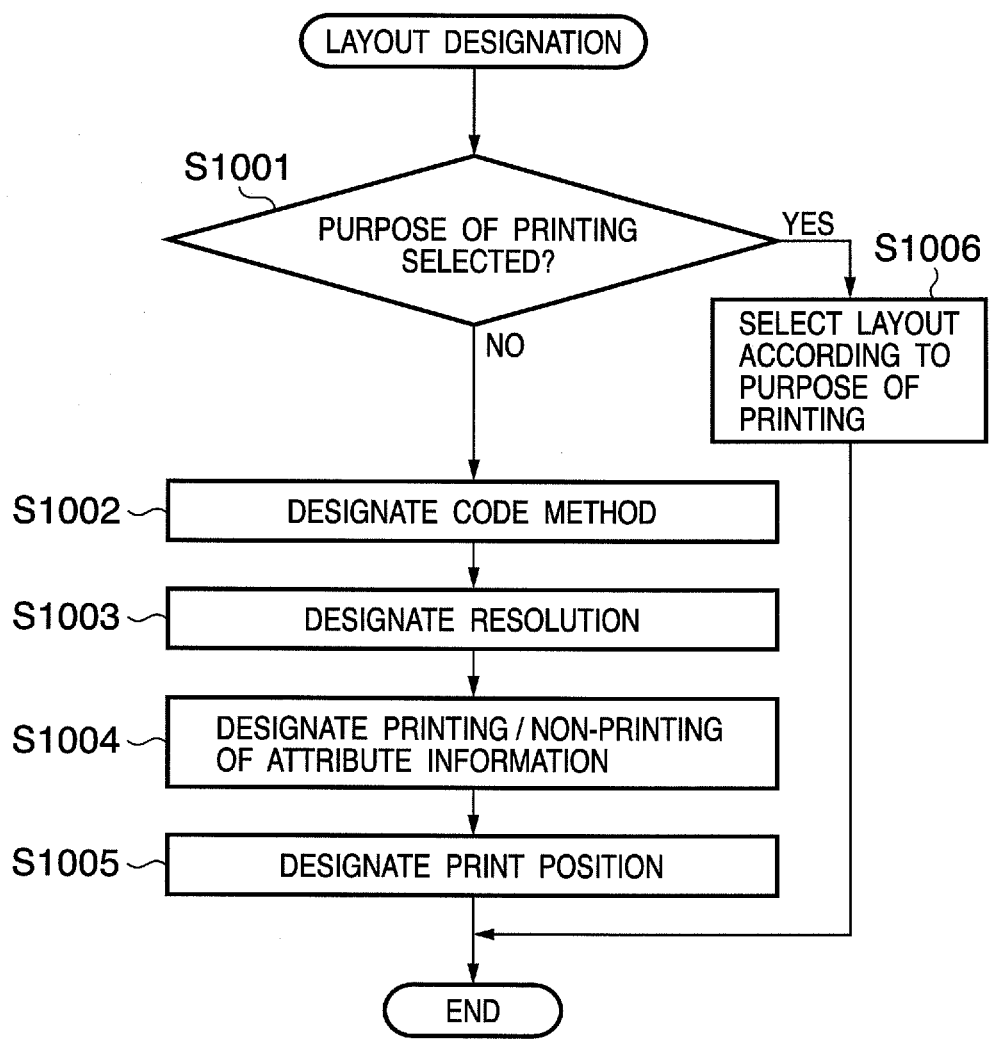
FIG. 10 is a flowchart showing an example of layout selection processing according to the embodiment.

FIG. 10 is a flowchart showing an example of the layout selection processing according to the embodiment. An instruction from the user associated with layout selection is input via, e.g., the aforementioned operation dialog 400 of the printer driver.

The CPU 251 checks in step S1001 if the user selects the purpose of printing. For example, the CPU 251 checks if the user selects any of the purposes of printing on the printing purpose selection area 413 on the operation dialog 400. If the user selects the purpose of printing, the process advances to step S1006. If the user does not select any purpose of printing, the process advances to step S1002.

In step S1002, the CPU 251 designates a code method to be applied to the attached file. For example, the CPU 251 designates one of the code methods based on an instruction input via the code method designation dialog 600. That is, the code method designation dialog 600 serves as a designating unit. When the user selects using the radio button 404 on the operation dialog 400 that he or she does not designate any code method, the CPU 251 may encode the attached file using a default code method.

In step S1003, the CPU 251 designates the printing resolution of the 2D code. For example, the CPU 251 designates, as the printing resolution, the resolution selected via the pull-down menu 801 on the resolution setting dialog 800.

In step S1004, the CPU 251 designates whether or not to print file information (a file name, data size, date & time of creation, type, or the like) of the attached file on the sheet. The CPU 251 designates based on the state of the radio buttons 407 whether or not to print the file information. Upon printing the file information, the CPU 251 may designate which file information is to be printed. As described above, the CPU 251 recognizes the file information selected via the setting dialog 700 as a print target.

In step S1005, the CPU 251 designates the print position of the 2D code. For example, the CPU 251 designates the print position of the 2D code based on the layout selected via the pull-down menu 901 of the layout designation dialog 900.

In this way, since the user can independently designate print settings associated with the print layout, the degree of freedom in the print layout upon printing the n-dimensional code can increase.

When the user has selected the purpose of printing, as described above, the CPU 251 selects a layout according to the selected purpose of printing. The CPU 251 may select a layout in consideration of other conditions (e.g., a file size and the like) in addition to the purpose of printing.

FIG. 11 shows an example of a table used to select a layout according to the embodiment. This table 1100 registers layouts 1103 in correspondence with purposes of printing 1101 and file sizes 1102 of attached files. For example, if the purpose of printing is "general" and the file size is "large", the CPU 251 selects "independent-page layout" as the layout.

Normally, if the attached file is data with a relatively small data size such as a text file or the like, the CPU 251 uses a code method which can set a relatively small 2D code size, and a relatively low resolution. In this case, since the image size of the 2D code can be reduced, the 2D code can be printed on the same page as the base file. For example, when the user selects "text file" as the purpose of printing, the CPU 251 designates LVBC as the code method, 200 dpi or 100 dpi as the resolution, and a single-page layout as the layout.

In this way, compared to the layout that prints the base file and 2D code on independent pages, the layout that prints both of them on a single page can save the number of sheets used in printing.

Note that the table 1100 exemplified in FIG. 11 also registers code methods 1104, printing/non-printing of file information 1105, and printing resolutions 1106 of the 2D codes in correspondence with the purposes of printing 1101 and file sizes 1102. Hence, if the purpose of printing and file size are determined, the CPU 251 can uniquely determine the code method, printing/non-printing of file information, and the resolution. Note that the table 1100 includes, as the purposes of printing, general, a document file, image file, audio file, movie file, and text file. However, other kinds of purposes of printing may be adopted. In this way, the table 1100 serves as a unit used to designate any of print settings according to the size of the attached file.

In this example, since there are two different file sizes, i.e., "large" and "small", only one threshold can be used. However, two or more thresholds may be adopted to classify a larger number of file sizes. In this way, a suited layout can be selected according to the file size.

In this way, since the CPU 251 automatically selects the layout according to the purpose of printing, it is advantageous for the user since individual settings about the layout can be omitted. That is, since the user can select the layout by designating only the purpose of printing, he or she can generate the data sheet by relatively simple operations.

Even when the purpose of printing is designated on the operation dialog 400, individual designations of the user should often take priority depending on the states of the radio buttons 404 and 407 and the check boxes 409 and 411. In this case, the CPU 251 may reflect the individually designated contents to the print instruction in preference to information acquired from the table 1100. In this manner, the user can customize the layout and the like in detail. More specifically, the operation dialog 400 can provide an optimal operation environment for each user.

[Free Setting of Layout]

Figure 12:
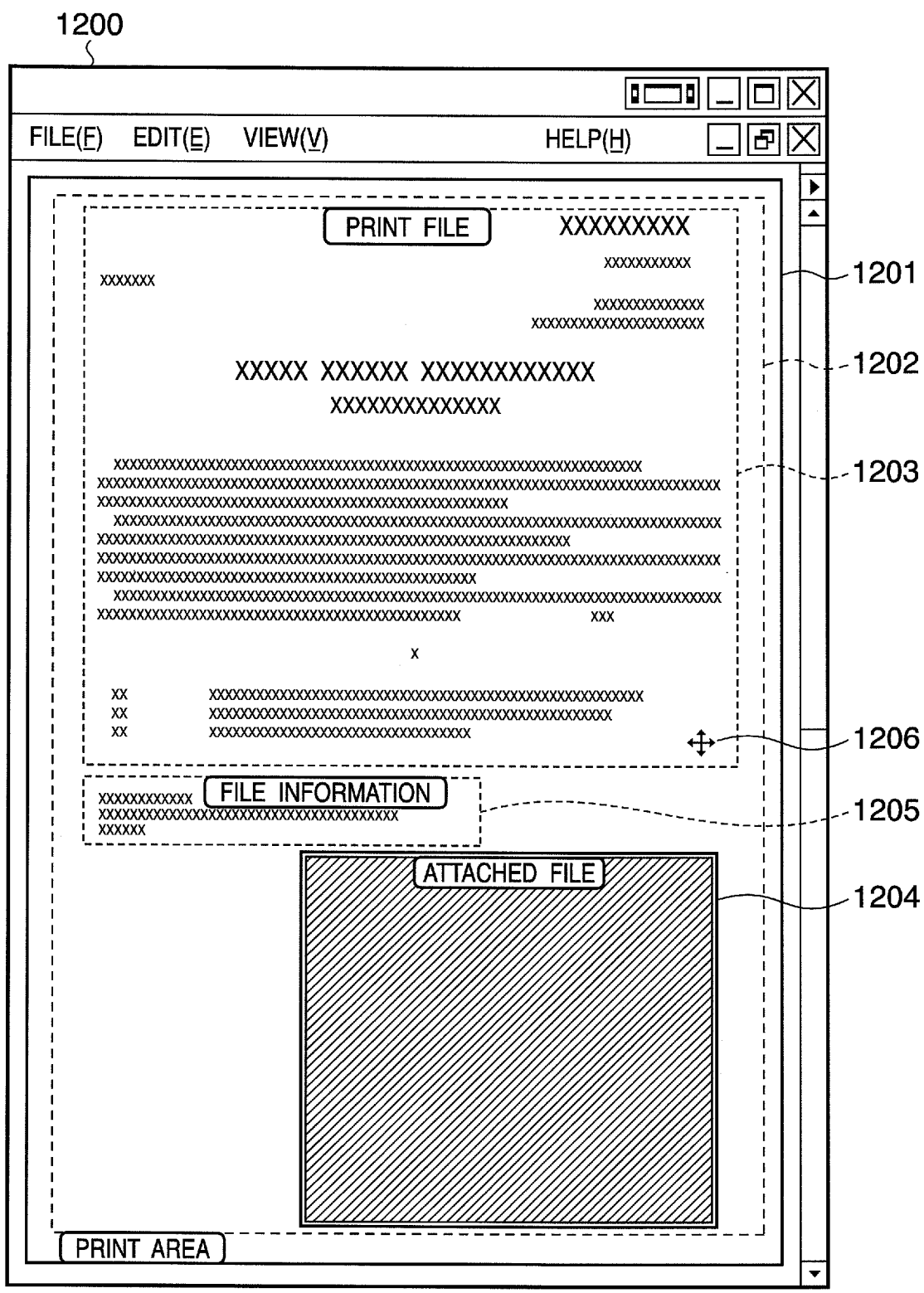
FIG. 12 shows a user interface of a layout tool used to freely set or change a layout.

FIG. 12 shows a user interface of a layout tool used to freely set or change the layout. Upon detection of pressing of the aforementioned layout designation button 412, the CPU 251 displays a user interface 1200 on the display module 258.

The user interface 1200 provides a layout setting dialog for the user who wants to designate the layout more finely. A broken line 1202 which represents a printable area, a print area 1203 of the base file, a print area 1204 of the 2D code of the attached file, and a print area 1205 of the file information are assured on a sheet 1201. A pointer 1206 is used to change the positions of the respective print areas and to reduce or enlarge the sizes of the print areas. As is well known, the pointer 1206 moves in synchronism with the operation of the input device 256 by the user.

The user interface 1200 allows the user to freely change the layout of the base file, 2D code, and file information. Note that such layout tool may be implemented as one function of the printer driver, or may be implemented by another dedicated application. If the layout tool is implemented as one function of the printer driver, the need for altering an application can be obviated.

Figure 13:
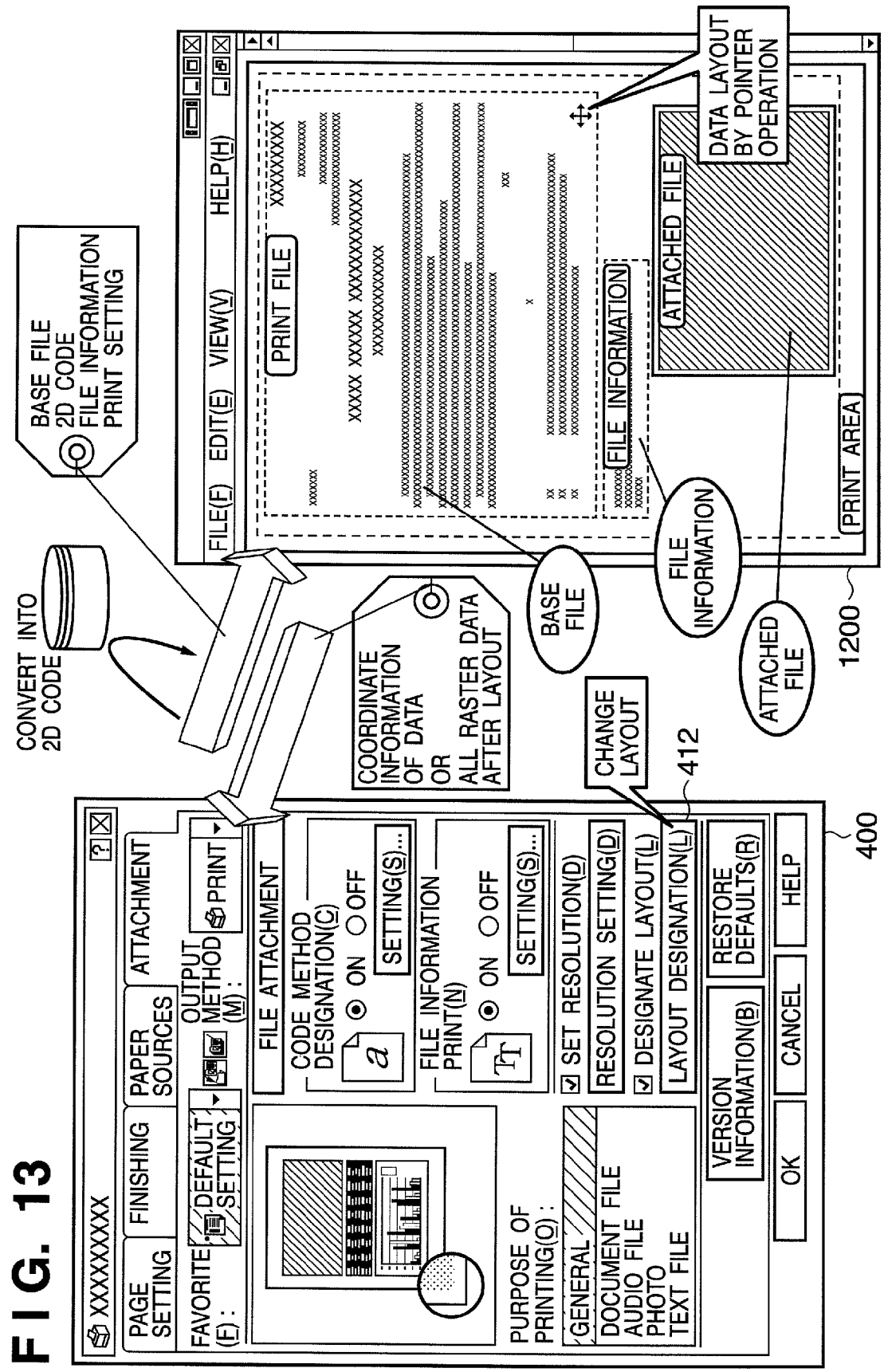
FIG. 13 is a view for explaining the concept of layout setting or changing processing according to the embodiment.

FIG. 13 is a view for explaining the concept of the layout setting or changing processing according to the embodiment. In the following description, the CPU 251 launches the layout tool in response to pressing of the layout designation button 412.

Upon launching the layout tools the printer driver passes information of the print settings (print paper size, print positions, sizes, and the like) of the 2D code, file information, and base file to the layout tool. The layout tool passes the X-Y coordinates of respective data which are required to lay out the base file, 2D code, file information, and the like on the sheet, and raster data after the layout to the printer driver. Of course, the layout changed by the layout tool is reflected on the data which are passed from the layout tool to the printer driver. In this way, the user can freely change the layout.

According to this embodiment, upon printing an n-dimensional code of an attached file on the sheet together with a base file, the user can easily select the attached file.

Since the user can select a suited print layout by selecting only the purpose of printing, he or she can obtain a print result by a simple operation.

Second Embodiment

The aforementioned embodiment has explained one example of the print mode that prints a base file and an n-dimensional code of an attached file on a sheet. However, even in a print instructing apparatus or printing apparatus which supports printing of an n-dimensional code, it is convenient for the user to switch various print modes according to his or her convenience. The user may want to print only a base file as per normal, or may want to print an n-dimensional code generated based on the base file. Also, the user may want to print a list including attribute information for one or more base files. Furthermore, as described in the first embodiment, the user may want to lay out at least one of an n-dimensional code, attribute information, and another file, and a base file, and to print them. Hence, the second embodiment will explain the invention which allows the user to select a print mode according to his or her convenience.

Figure 14:
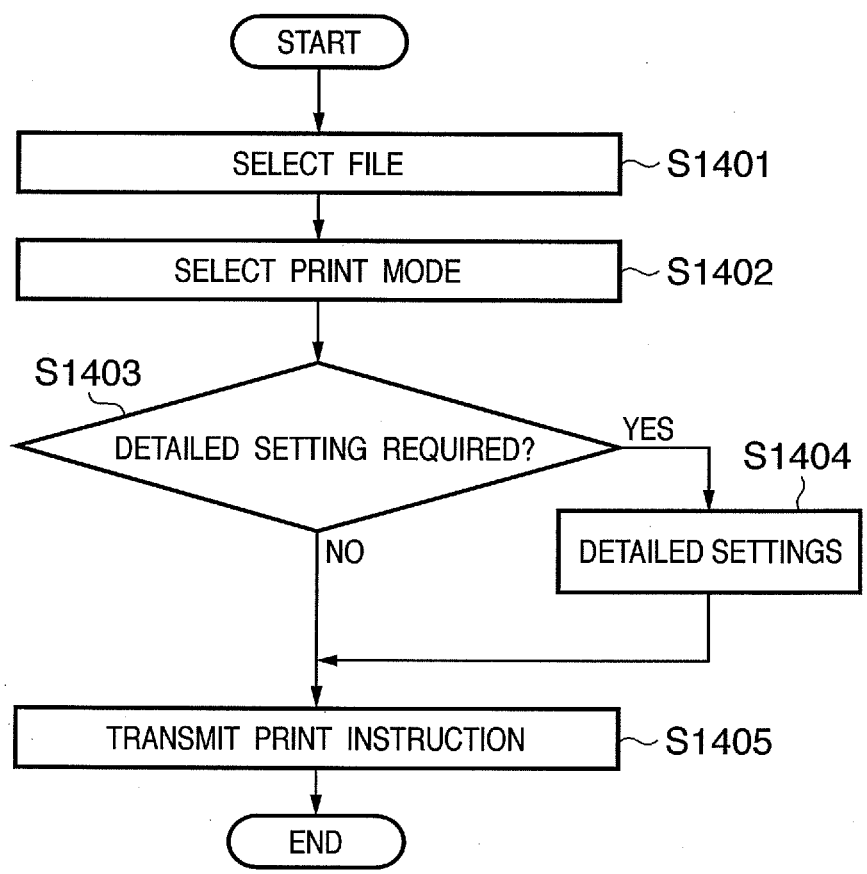
FIG. 14 is a flowchart showing an example of print instructing processing according to the embodiment.

FIG. 14 is a flowchart showing an example of the print instructing processing according to the embodiment. In step S1401, the CPU 251 executes the selection processing of a file serving as a print target. The file selection processing may be executed by an application program or may be executed using the function of the OS. For example, a user interface associated with the selection processing may be implemented as follows.

Figure 15:
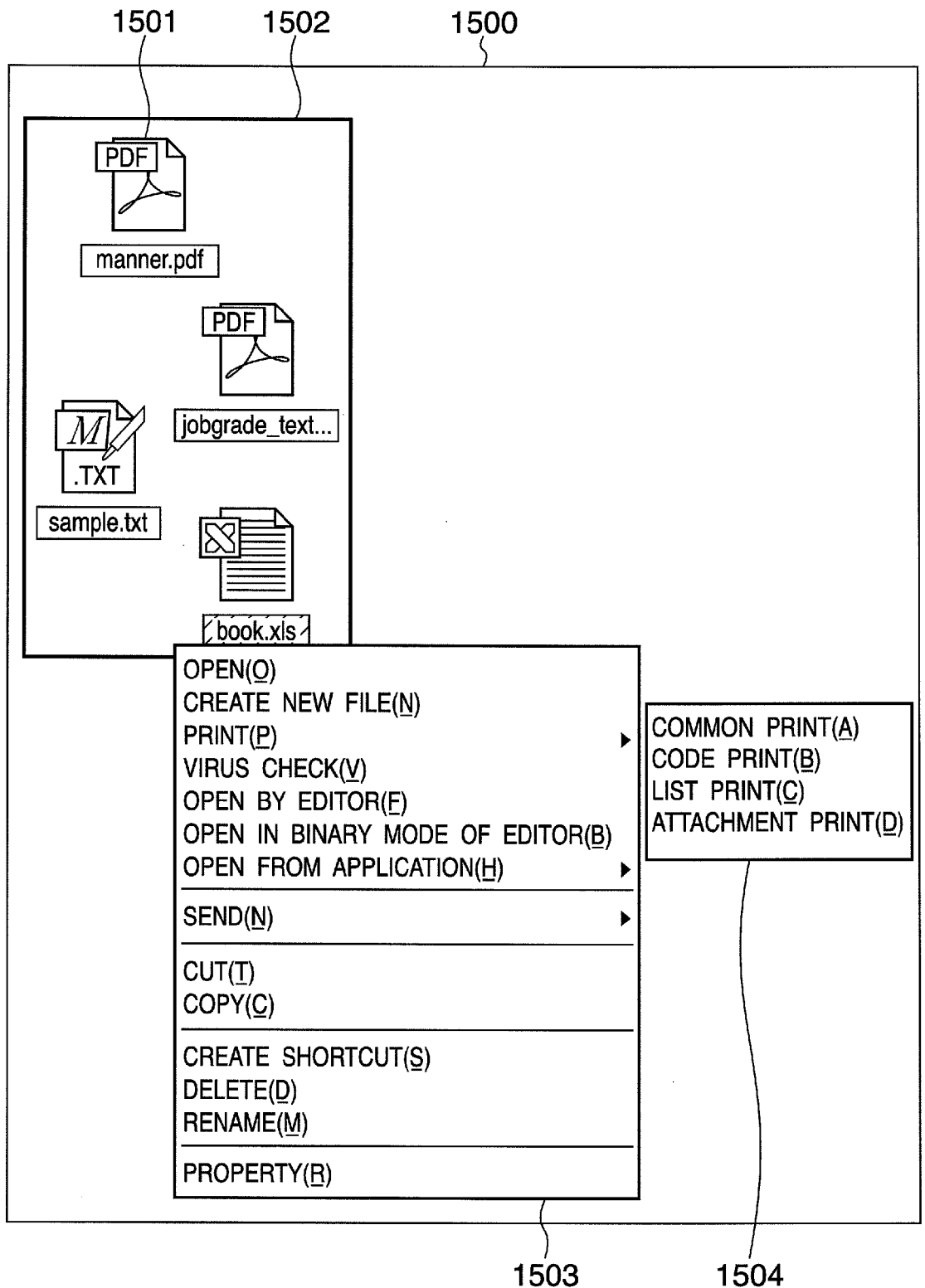
FIG. 15 is a view for explaining an example of file selection processing according to the embodiment.

FIG. 15 is a view for explaining an example of the file selection processing according to the embodiment. In this example, when the user drags a pointer across various files 1501 placed on a desktop 1500, the CPU 251 selects files which exist within the dragged range as those to be processed. In this state, when the user clicks the right button of the input device 256, the CPU 251 displays a right-click menu 1503 on the display module 258. Furthermore, when the user selects "print" from items included in the right-click menu 1503, the CPU 251 displays a sub menu 1504. The user selects a print mode via this sub menu 1504.

The user can select, e.g., the following print modes from this sub menu 1504. Note that one example of an attachment print mode is as has been described in the first embodiment. In a list print mode, the CPU 251 may not print the print target file itself on the sheet and may print file information and path information of that file as a list. In this case, the CPU 201 or 251 transfers the file to the HDD 210 or 260 or to a server on the network. This is to allow the user to acquire the file according to the path information acquired from the list. Also, the attachment print mode is effective when the user wants to attach an image of a product and more detailed information to a brochure of the product upon printing.

a common print mode that prints a base file a code print mode that prints an n-dimensional code generated from the base file a list print mode that prints a list including attribute information for one or more base files an attachment print mode that lays out at least one of an n-dimensional code, attribute information, and another file in addition to the base file, and prints the laid-out data In step S1402, the CPU 251 selects a print mode. Note that the print mode selection processing may be executed via the right-click menu 1503 or via the user interface of the printer driver.

Figure 16:
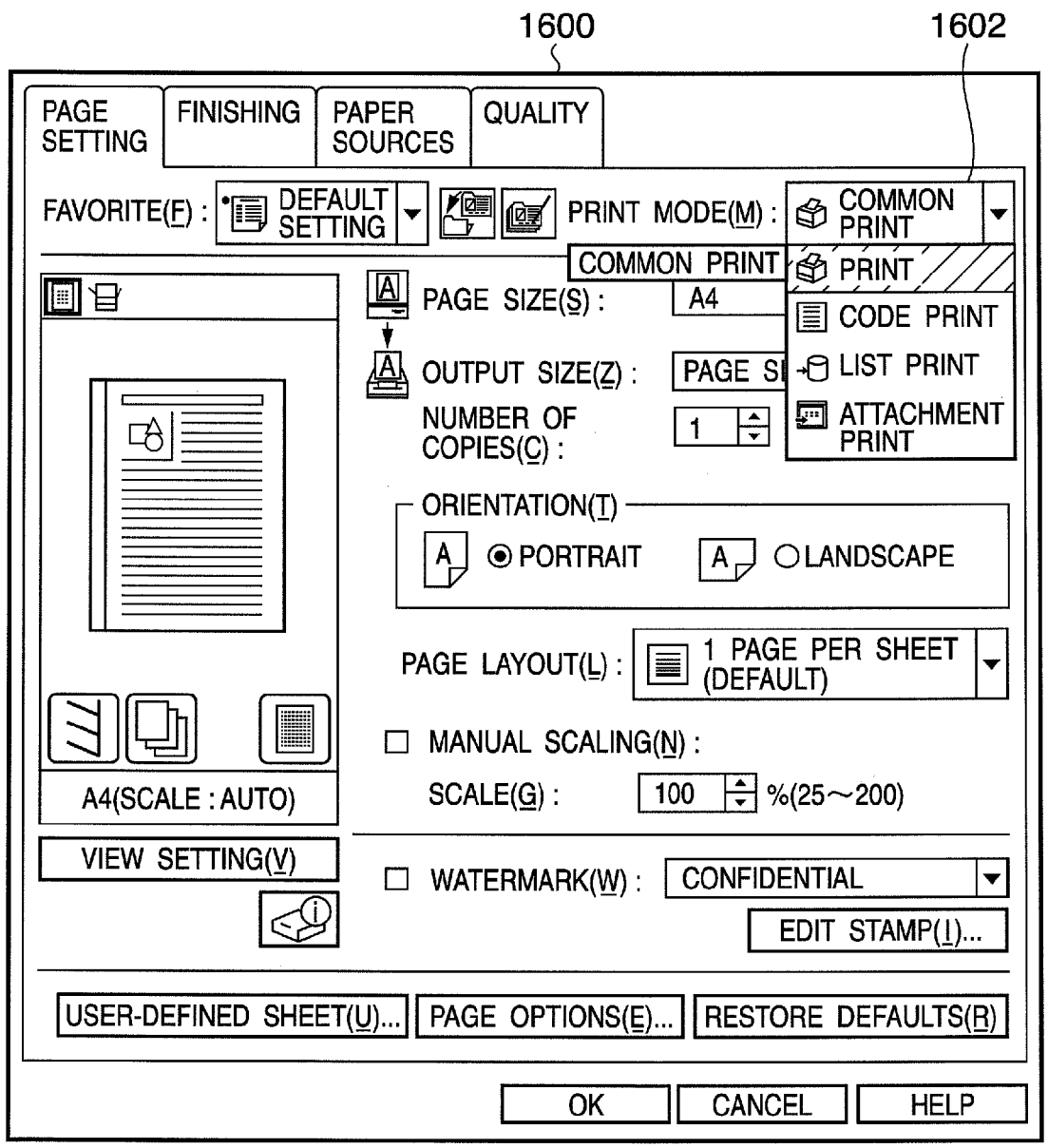
FIG. 16 is a view for explaining another example of the file selection processing according to the embodiment.

FIG. 16 is a view for explaining another example of the file selection processing according to the embodiment. An operation dialog 1600 is a user interface of the printer driver displayed upon launching the printer driver. A pull-down menu 1602 is used to select the print mode. As can be seen from FIG. 16, the pull-down menu 1602 displays a plurality of alternatively selectable print modes.

The CPU 251 checks in step S1403 if detailed settings are required to execute the selected print mode. For example, the list print mode requires to set the transfer destination of a file. If the detailed settings are required, the process advances to step S1404, and the CPU 251 displays a dialog used to allow the user to make detailed settings on the display module 258 and accepts setting information input via the input device 256. If detailed settings are not required, the process advances to step S1405.

In step S1405, the CPU 251 transmits a print instruction according to the selected print mode. Various modes of print instructions may be used. For example, the CPU 251 may transmit a command in accordance with the selected print mode, and also raw data (file itself). In this case, the CPU 201 of the MFP 100 executes rendering processing to raster data.

More specifically, when the user designates the common print mode, the CPU 251 transmits PDL data generated based on the designated base file, and a command indicating the common print mode. When the user designates the code print mode, the CPU 251 transmits raw data of the selected attached file and a command indicating the code print mode. When the user designates the list print mode, the CPU 251 transmits raw data of the selected attached file, and a command indicating the list print mode. When the user selects the attachment print mode, the CPU 251 transmits PDL data of the designated base file, raw data of the selected attached file, and a command indicating the attachment print mode.

Note that the printer driver may generate PDL data or raster data according to the print mode, and may transmit the generated data to the MFP 100. In the common print mode, the CPU 251 generates PDL data or raster data of the selected file, and transmits the generated data to the MFP 100. In the code output mode, the CPU 251 generates an n-dimensional code of the selected file, generates PDL data or raster data for the n-dimensional code, and transmits them to the MFP 100. In the list print mode, the CPU 251 generates a list based on file information (path information and the like) of the selected files, generates PDL data or raster data for the list, and transmits them to the MFP 100. Note that the attachment print mode is as has been described in the first embodiment.

Note that the CPU 251 may select according to the print mode whether it transmits print data such as PDL data or the like or raw data. For example, upon selection of the common print mode, the CPU 251 may transmit PDL data or raster data to the MFP 100, and upon selection of a print mode other than the common print mode, it may transmit raw data of a file to be printed to the MFP 100. When the MFP 100 comprises hardware (e.g., an encoder or the like) used to generate an n-dimensional code, it is efficient to generate the n-dimensional code by the MFP 100. When the MFP 100 serves as a file server, since the MFP 100 stores raw data, the need of file transfer can be cut out.

Figure 17:
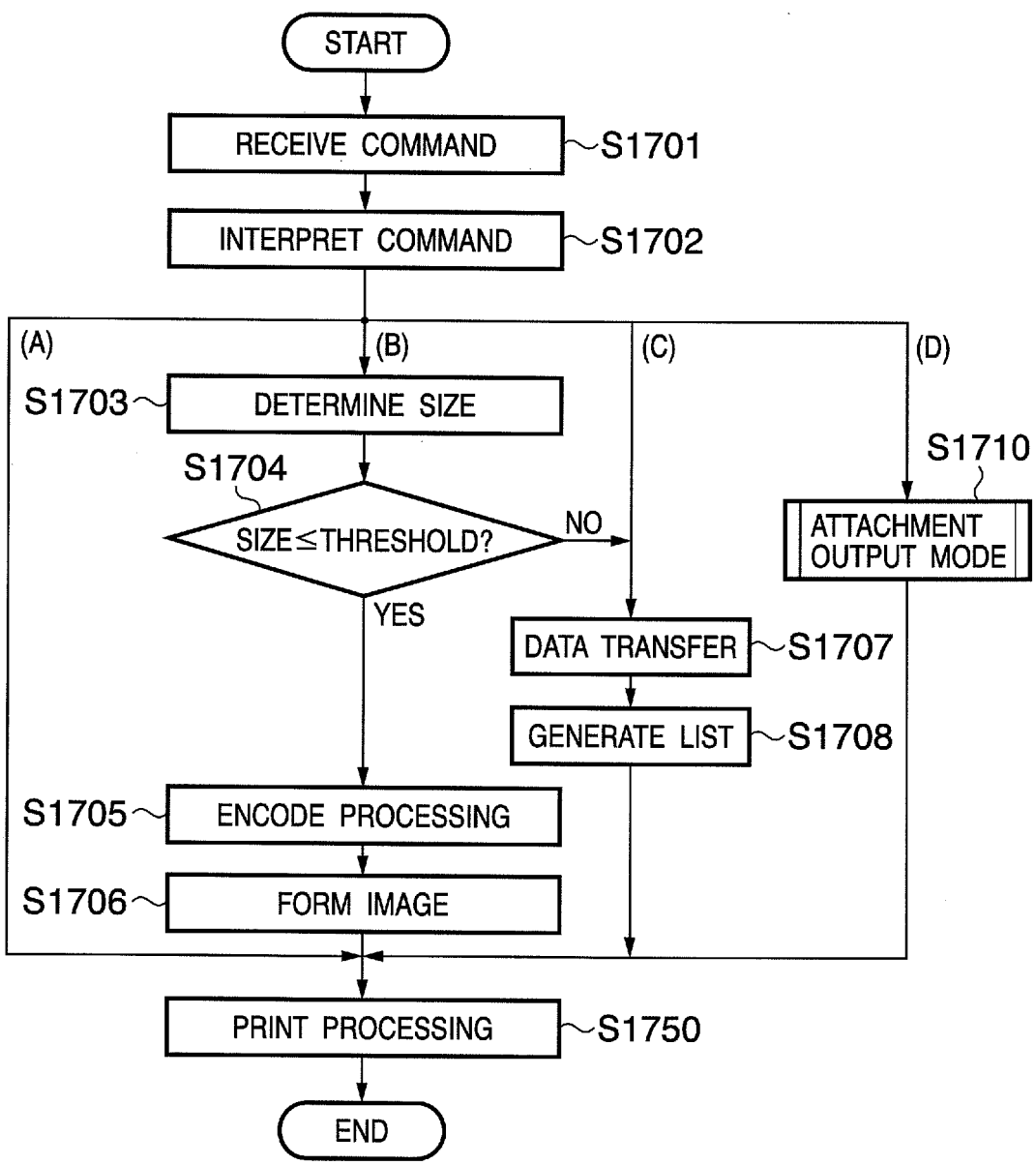
FIG. 17 is a flowchart showing an example of a control method of a printing apparatus according to the embodiment.

FIG. 17 is a flowchart showing an example of the control method of the printing apparatus according to the embodiment. An example will be described below wherein the MFP 100 interprets a command, and executes print processing according to the print mode. Of course, the printer driver may execute the processes in steps S1701 to S1710 to be described below.

In step S1701, the CPU 201 receives a command transmitted from the network device 105 via the NIC 204. In step S1702, the CPU 201 interprets the received command. In this way, the CPU 201 can determine which of the common print mode (A), code print mode (B), list print mode (C), and attachment print mode (D) the user designated.

If the user designated the common print mode, the process jumps to step S1750. In step S1750, the CPU 201 (generates intermediate data and) forms a raster image (based on the generated intermediate data) based on received print data (PDL), and prints the formed raster image using the print unit 211. If the user designated the code print mode, the process advances to step S1703, and the CPU 201 determines the size of an n-dimensional code generated based on the file to be printed.

The CPU 201 checks in step S1704 if the size of the n-dimensional code is equal to or smaller than a threshold. Even upon selection of the code print mode, the n-dimensional code may not be printed on the sheet depending on the size of the n-dimensional code or sheet.

Figure 18:
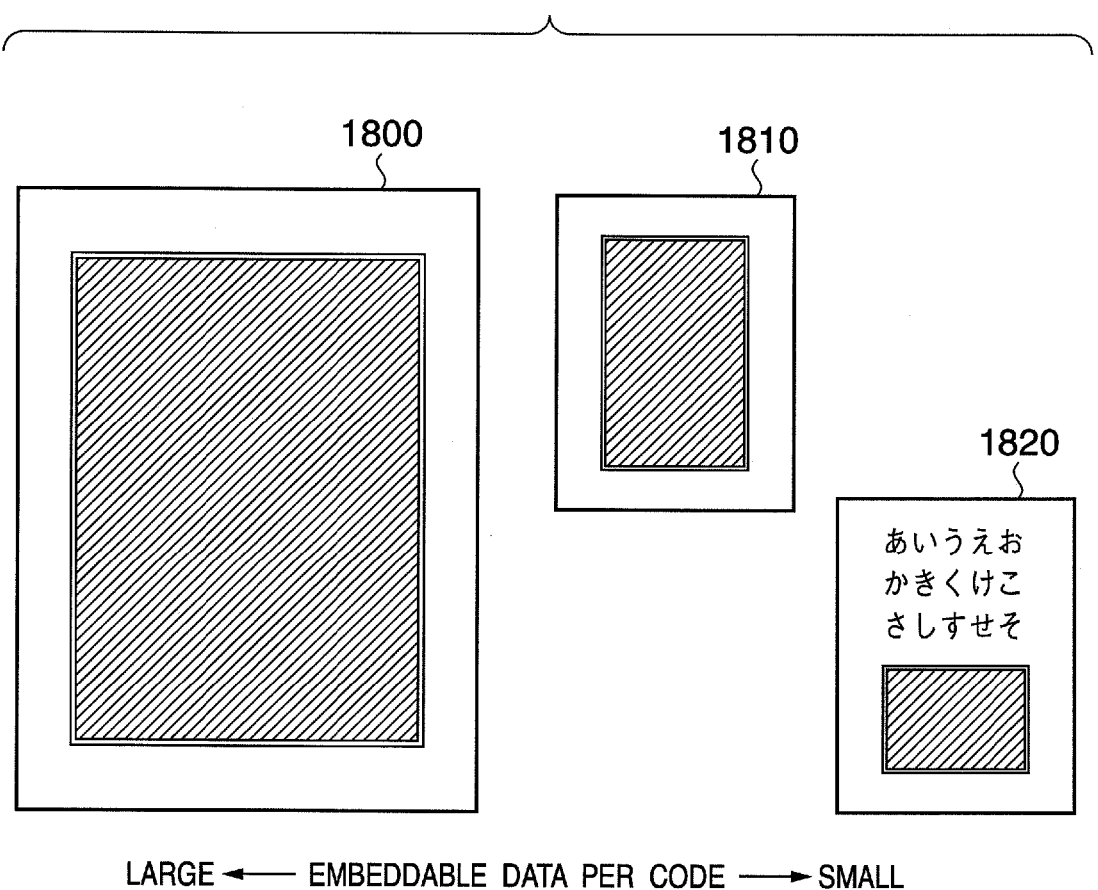
FIG. 18 is a view for explaining the relationship between the sizes of sheets and n-dimensional codes that can be printed on the sheets.

FIG. 18 shows the relationship between the sizes of sheets and n-dimensional codes that can be printed on the sheets. Since a sheet 1800 has a relatively large size, the size of a printable n-dimensional code is also large. On the other hand, since a sheet 1810 has a relatively small size, the size of a printable n-dimensional code is also small. Upon printing a document file and the n-dimensional code of an attached file on a single page like a sheet 1820, the size of a printable n-dimensional code is smaller.

In view of such situation, the threshold is determined with reference to an n-dimensional code with a maximum printable size on a sheet to be printed. That is, the threshold desirably assumes a value equal to or smaller than such maximum size. This is not the case when an n-dimensional code is divisionally printed on two or more sheets.

Of course, the CPU 201 desirably changes the threshold in correspondence with the sheet size. This is because different maximum printable sizes are required depending on the sheet sizes. Note that the correspondence between the sheet sizes and thresholds may be stored as a table in the HDD 210 or the like.

As a result of checking, if the size of the n-dimensional code is equal to or smaller than the threshold, the process advances to step S1705, and the CPU 201 generates the n-dimensional code. After that, in step S1706 the CPU 201 forms a raster image required to print the n-dimensional code on the sheet. In step S1750, the CPU prints the formed raster image using the print unit 211.

On the other hand, if the size of the n-dimensional code exceeds the threshold, the process advances to step S1707, and the CPU 201 transfers the file to be printed to a predetermined transfer destination. For example, the CPU 201 transfers the file to the HDD 210, a file server, or the like, and writes the file in it. In this case, the CPU 201 may accept information of the transfer destination input via the control panel 206. In step S1708, the CPU 201 generates a list according to the file information of the transferred file, and forms a raster image required to print the list. In step S1750, the CPU 201 prints the formed raster image using the print unit 211.

If the user designated the list print mode as a result of command interpretation, the CPU 201 executes steps S1707 and S1708 described above.

If the user designated the attachment output mode, the process advances to step S1710, and the CPU 201 executes the print processing (S302, S303) shown in FIG. 3. More specifically, the CPU 201 determines the presence of the attached file in step S302, and the process advances to step S303. In step S303, the CPU 201 generates an n-dimensional code based on raw data of the received attached file. The CPU 201 then generates PDL data that prints the n-dimensional code of the attached file at a position according to the selected layout, and generates PDL data including the generated PDL data and PDL data that prints the base file at a position according to the received selected layout. In this case, the CPU 201 generates the PDL data. Alternatively, the CPU 201 may generate intermediate data which includes intermediate data that prints the n-dimensional code of the attached file, and intermediate data that prints the base file. The process then advances to step S1750, and the CPU 201 forms a raster image based on the generated PDL data (or intermediate data) and prints the formed raster image using the print unit 211.

In this way, upon reception of a print instruction of the n-dimensional code generated based on the file to be printed, the MFP 100 checks if the size of the n-dimensional code exceeds the threshold. If the size of the n-dimensional code exceeds the threshold, the MFP 100 transfers that file to a predetermined storage device (e.g., the HDD 210 or the like). The MFP 100 prints path information indicating the storage location of the transferred file as a list. As a result, a large number of data sheets on which the n-dimensional code is printed can be prevented from being generated. Also, the user can arbitrarily acquire the transferred file based on the path information.

[Example of Print Result]

FIG. 19A shows the print results upon execution of the common print mode according to the embodiment. This example shows print results 1901A, 1902A, 1903A, and 1904A when four files are selected as print targets. These results are well-known ones obtained upon printing a document file, PDF file, and the like as per normal.

FIG. 19B shows the print results upon execution of the code print mode according to the embodiment. This example shows print results 1901B, 1902B, 1903B, and 1904B when four files are selected as print targets. On every sheet, the images of the n-dimensional codes are printed.

Figure 19C:
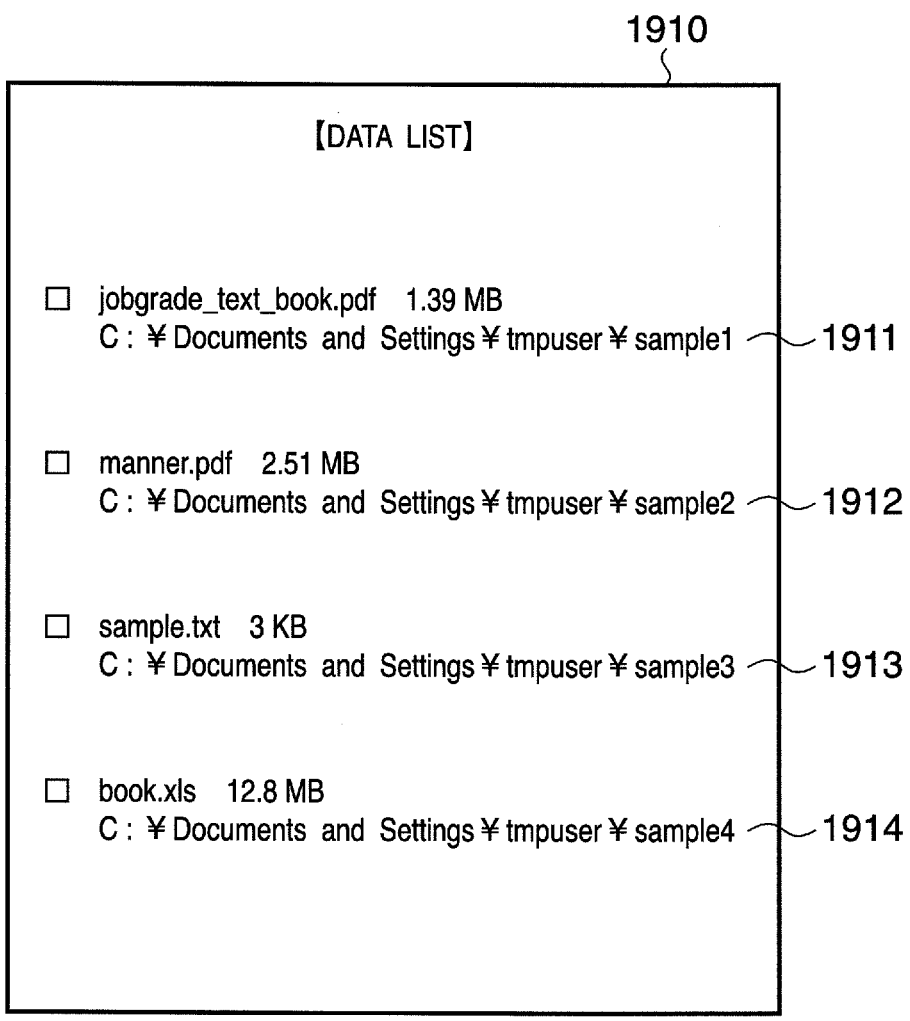
FIG. 19C shows a print result obtained upon execution of a list print mode according to the embodiment.

FIG. 19C shows the print result upon execution of the list print mode according to the embodiment. This example shows a data list 1910 as the print result when four files are selected as print targets. Four pieces of file information 1911, 1912, 1913, and 1914 respectively correspond to the four files. This example shows the file name, file size, and path information as the file information for each file. The MFP 100 can acquire desired files based on the path information described on the data sheet by scanning such data sheet by the scanner 102.

FIG. 19D shows the print results upon execution of the attachment print mode according to the embodiment. This example shows the print results when a base file and four attached files are selected as print targets. Especially, FIG. 19D shows print results 1901D, 1902D, 1903D, and 1904D of four n-dimensional codes corresponding to the four attached files.

According to this embodiment, the user can easily generate a data sheet on which an n-dimensional code is printed by selecting a desired one of a plurality of print modes which are prepared in advance.

When the n-dimensional code has a large size, the path information of each file to be printed is printed as a list, and a large number of data sheets can be prevented from being printed.

Other Embodiments

Various embodiments have been explained in detail. However, the present invention can be applied to either a system constituted by a plurality of devices, or an apparatus consisting of a single device. For example, the present invention may be applied to a scanner, printer, PC, copying machine, MFP, and facsimile apparatus.

The present invention can also be achieved by directly or remotely supplying a program of software that implements the functions of the aforementioned embodiments to a system or apparatus, and reading out and executing the supplied program code by a computer of that system or apparatus.

Therefore, the program code itself installed in a computer to implement the functions and processing of the present invention using the computer implements the present invention. That is, the present invention includes the computer program itself for implementing the functions and processing of the present invention.

In this case, the form of program is not particularly limited, and an object code, a program to be executed by an interpreter, script data to be supplied to an OS, and the like may be used as long as they have the program function.

As a recording medium for supplying the program, for example, a flexible disk, hard disk, optical disk, magneto-optical disk, MO, CD-ROM, CD-R, CD-RW, and the like may be used. Also, as the recording medium, a magnetic tape, nonvolatile memory card, ROM, DVD (DVD-ROM, DVD-R), and the like may be used.

The program may also be downloaded from a home page on the Internet using a browser running on a client computer. That is, the computer program itself of the present invention or a compressed file including an automatic installation function may be downloaded onto a recording medium such as a hard disk or the like. The program code which forms the program of the present invention may be segmented into a plurality of files, and the respective files may be downloaded from different home pages. That is, a WWW server which makes a plurality of users download the program file for implementing the functions and processing of the present invention using a computer may also become a building component of the present invention.

A storage medium such as a CD-ROM or the like, which stores the encrypted program of the present invention may be distributed to users. In this case, only a user who meets predetermined conditions is allowed to download key information used to decrypt the encrypted program from a home page via the Internet, to decrypt the encrypted program using that key information, and to install the program in the computer.

The functions of the aforementioned embodiments may be implemented by executing the readout program code by the computer. Note that an OS or the like running on the computer may execute some or all of actual processes on the basis of an instruction of that program. Of course, in such case as well, the functions of the aforementioned embodiments can be implemented.

Furthermore, the program read out from the recording medium may be written in a memory equipped in a function extension board or function extension unit, which is inserted in or connected to the computer. Based on an instruction of that program, a CPU or the like equipped in the function extension board or function extension unit may execute some or all of actual processes. In this way, the functions of the aforementioned embodiments may be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026176, filed Feb. 2, 2006, which is hereby incorporated by reference herein in its entirety.

What is claimed is:

1. An information processing apparatus comprising:
   a generation unit which generates a 2D code from an attached file;
   a displaying unit which displays a printing product including a base file area for a base file and an attached file area for the 2D code generated from the attached file; and
   a processing unit which selects a printing layout from a plurality of printing layouts in accordance with at least a selected purpose of printing, independently from the size of the attached file, wherein the plurality of printing layouts includes a printing layout in which the base file and the 2D code generated from the attached file are printed on the same page and a printing layout in which the base file and the 2D Code are printed on different pages;
   wherein, when the printing layout in which the base file and the 2D code generated from the attached file are printed on the same page is selected by the processing unit, the base file is reduced in size if necessary and the base file and the 2D code are printed on the same page, and wherein when the printing layout in which the base file and the 2D code are printed on different pages is selected by the processing unit, the 2D code generated from the attached file is printed on a page different from a page on which the base file is printed.

2. The information processing apparatus according to claim 1, wherein the displaying unit further displays a printable area.

3. The information processing apparatus according to claim 1, wherein the printing product including the printing area for the base file and the printing area for the 2D code is displayed when a layout change instruction is inputted through a screen of a printer driver.

4. A method of controlling a printing apparatus, comprising:
- a generation step which generates a 2D code from an attached file;
- a displaying step which displays a printing product including a based file area for a base file and an attached area for the 2D code generated from the attached file; and
- a processing step which selects a printing layout from a plurality of printing layouts in accordance with at least a selected purpose of printing, independently from the size of the attached file, wherein the plurality of printing layouts includes a printing layout in which the base file and the 2D code generated from the attached file are printed on a same page and a printing layout in which the base file and the 2D Code are printed on different pages;

wherein, when the printing layout in which the base file and the 2D code generated from the attached file are printed on the same page is selected, the base file is reduced in size if necessary and the base file and the 2D code are printed on the same page, and wherein when the printing layout in which the base file and the 2D code are printed on different pages is selected, the 2D code generated from the attached file is printed on a page different from a page on which the base file is printed.

5. A non-transitory computer readable storage medium having a program stored thereon that is accessible by a computer and which causes the computer to execute the method of controlling a printing apparatus according to claim 3.

* * * * *